United States Patent
Yoshii et al.

(10) Patent No.: US 12,352,257 B2
(45) Date of Patent: Jul. 8, 2025

(54) PUMP AND AIR SUPPLY DEVICE

(71) Applicant: MINEBEA MITSUMI INC., Nagano (JP)

(72) Inventors: Yuta Yoshii, Tokyo (JP); Shigenori Inamoto, Tokyo (JP); Yuki Takahashi, Tokyo (JP); Chikara Sekiguchi, Tokyo (JP); Daisuke Kodama, Tokyo (JP); Daisuke Kurita, Nagano (JP)

(73) Assignee: MINEBEA MITSUMI INC., Nagano (JP)

( * ) Notice: Subject to any disclaimer, the term of this patent is extended or adjusted under 35 U.S.C. 154(b) by 281 days.

(21) Appl. No.: 17/907,658

(22) PCT Filed: Mar. 24, 2021

(86) PCT No.: PCT/JP2021/012112
§ 371 (c)(1),
(2) Date: Sep. 28, 2022

(87) PCT Pub. No.: WO2021/200424
PCT Pub. Date: Oct. 7, 2021

(65) Prior Publication Data
US 2023/0151805 A1    May 18, 2023

(30) Foreign Application Priority Data
Mar. 31, 2020  (JP) .................................. 2020-064594

(51) Int. Cl.
*F04B 45/047* (2006.01)
*B06B 1/04* (2006.01)
(52) U.S. Cl.
CPC ............ *F04B 45/047* (2013.01); *B06B 1/045* (2013.01)

(58) Field of Classification Search
CPC ...... F04B 45/047; F04B 45/043; B06B 1/045; B06B 2201/53; H02K 33/16
(Continued)

(56) References Cited

U.S. PATENT DOCUMENTS 6,249,065 B1    6/2001  Oudet et al.
2006/0175909 A1    8/2006  Kraus
(Continued)

FOREIGN PATENT DOCUMENTS

CN    1420272 A    5/2003
DE    1846719 U    2/1962
(Continued)

OTHER PUBLICATIONS

European Patent Office, Extended European Search Report Issued in Application No. 21780810.4, Jun. 20, 2024, Germany, 11 pages.
(Continued)

*Primary Examiner* — Dominick L Plakkoottam
(74) *Attorney, Agent, or Firm* — McCoy Russell LLP

(57) ABSTRACT

A pump contains a pump unit for suctioning and discharging fluid due to electromagnetic drive of a vibration actuator. The vibration actuator includes a fixed body containing one of a coil core portion and a magnet, a movable body containing another one of the coil core portion and the magnet, and a shaft portion for supporting the movable body so that the movable body can perform reciprocating rotation. The pump unit includes a movable wall, and a sealed chamber whose volume can be changed by displacement of the movable wall. The movable body has a pressing portion which can abut against the movable wall to press the movable wall when the movable body performs the reciprocating rotation.

13 Claims, 32 Drawing Sheets

(58) Field of Classification Search
USPC .......................................................... 417/481
See application file for complete search history.

(56) References Cited

U.S. PATENT DOCUMENTS

| | | | |
|---|---|---|---|
| 2020/0136545 A1* | 4/2020 | Hu | ........................ H02P 25/032 |
| 2020/0227994 A1 | 7/2020 | Tosoni et al. | |
| 2021/0273543 A1* | 9/2021 | Takahashi | .............. H02K 33/18 |

FOREIGN PATENT DOCUMENTS

| | | | | |
|---|---|---|---|---|
| DE | 202013000479 U1 * | 6/2014 | ............ | F04B 43/021 |
| FR | 3069119 A1 | 1/2019 | | |
| JP | S5139813 U | 3/1976 | | |
| JP | S60142073 A | 7/1985 | | |
| JP | 2002106471 A | 4/2002 | | |
| JP | 2019075966 A | 5/2019 | | |
| WO | 2009119450 A1 | 10/2009 | | |
| WO | WO-2017140180 A1 * | 8/2017 | ............... | B05B 9/04 |

OTHER PUBLICATIONS

ISA Japanese Patent Office, International Search Report Issued in Application No. PCT/JP2021/012112, May 25, 2021, WIPO, 4 pages.

* cited by examiner

PUMP AND AIR SUPPLY DEVICE

CROSS REFERENCE TO RELATED APPLICATIONS

The present application is a U.S. National Phase of International Application No. PCT/JP2021/012112, entitled "PUMP AND AIR SUPPLY DEVICE," and filed on Mar. 24, 2021. International Application No. PCT/JP2021/012112 claims priority to Japanese Patent Application No. 2020-064594 filed on Mar. 31, 2020. The entire contents of each of the above-listed applications are hereby incorporated by reference for all purposes.

TECHNICAL FIELD

The present invention relates to a pump and an air supply device using a vibration actuator.

BACKGROUND

Conventionally, there has been known a small pump using a rotary motor as shown in patent document 1, a pump utilizing resonance of a motor as shown in patent document 2, a pump using a piezoelectric element or the like as a pump used for a sphygmomanometer or the like.

In the small pump of the patent document 1, a plurality of diaphragms forming a pump chamber are provided in a case, a suction valve is provided in the pump chamber and a cylindrical discharge valve body is formed at a center portion of the pump chamber. The plurality of diaphragms are connected to a swinging body which can be swung by rotation of an eccentric rotation shaft and thus the diaphragms can move up and down when the swinging body swings. The eccentric rotation shaft is eccentrically fixed to a disk portion fixed to a rotation shaft of a DC motor disposed below the eccentric rotation shaft. This pump uses the eccentric rotation shaft and the swinging body to convert normal rotation of the DC motor around the rotation shaft thereof into precession movement for moving the diaphragms up and down.

Further, the pump of the patent document 2 is a reciprocating motor having a cylindrical shape. Each of a fixed portion and a movable portion of this reciprocating motor has a magnet and the pump device is driven by utilizing a resonance phenomenon to achieve air suction and air discharge. Furthermore, in the pump using the piezoelectric element, a diaphragm is reciprocated by the piezoelectric element to repeat air suction and air discharge through valves for switching between the air suction and the air discharge.

RELATED ART DOCUMENTS

Patent Documents

Patent document 1: JP 2002-106471A
Patent document 2: JP 2019-75966A

SUMMARY

Problems to be Solved by the Invention

In this regard, there are needs of utilizing any one of the above-described pumps in a routinely-used device such as a sphygmomanometer. Thus, a high-performance pump which has a thinner thickness and can increase a flow rate and pressure of the air has been needed.

However, it is easy to increase output power of the rotary motor used in the pump of the patent document 1, whereas there is a problem that a magnetic efficiency of the rotary motor deteriorates due to its structure restriction if a thickness of the rotary motor is reduced and thus characteristics of the rotary motor significantly deteriorates. Further, the pump of the patent document 2 has a problem that it is difficult to reduce a thickness of the pump because the pump has a cylindrical shape.

Further, it is easy to reduce a size of the pump using the piezoelectric element, whereas there is a problem that a vibration displacement amount of the piezoelectric element is small and pressure characteristics or flow characteristics of the pump are limited, and thereby it is very difficult to achieve both of a desired pressure and a desired flow rate.

The present invention has been made in view of the above-described conventional problems. Accordingly, it is an object of the present invention to provide a high-performance pump whose thickness can be reduced and which can secure a high discharge pressure and a large transfer flow rate and an air supply device including the high-performance pump.

Means for Solving the Problems

This object is achieved by the present inventions as defined in the following (1) to (13).

(1) A pump, comprising:
a vibration actuator which can be electromagnetically driven; and
a pump unit for suctioning and discharging fluid due to electromagnetic drive of the vibration actuator,
wherein the vibration actuator includes:
a fixed body on which the pump unit is provided, the fixed body containing one of a coil core portion having a coil and a core portion around which the coil is wound and a magnet disposed so as to face an end portion of the core portion,
a movable body elastically held by magnetic attraction force of the magnet, the movable body containing another one of the coil core portion and the magnet, and
a shaft portion for supporting the movable body so that the movable body can perform reciprocating rotation,
wherein the pump unit includes:
a movable wall which can be moved by rotational movement of the movable body, and
a sealed chamber which is communicated with a discharge port for the fluid and a suction port for the fluid and whose volume can be changed by displacement of the movable wall,
wherein the movable body has a pressing portion which can be moved in an arc track around the shaft portion and abut against the movable wall to press the movable wall when the movable body performs the reciprocating rotation, and
wherein the movable wall is disposed in a moving direction of the pressing portion and displaced when the movable wall is pressed by the pressing portion to discharge the fluid in the sealed chamber through the discharge port.

(2) The pump according to the above (1), wherein the movable body is provided so as to extend in a direction perpendicular to an axial direction of the shaft portion from a portion axially supported by the shaft portion so that the movable body can perform the reciprocating rotation and has an arm portion,
  wherein the other one of the coil core portion and the magnet is provided on an end portion of the arm portion,
  wherein the sealed chamber contains a pair of sealed chambers,
  wherein the pair of sealed chambers are disposed so as to face each other at position sandwiching the arm portion in a reciprocating rotation direction of the arm portion,
  wherein the movable wall contains a pair of movable walls,
  wherein the pressing portion has a pair of pushers respectively corresponding to the pair of movable walls, and
  wherein each of the movable walls of the sealed chamber is pressed by the pusher when the arm portion performs reciprocating rotation.

(3) The pump according to the above (1), wherein the movable body has a center portion axially supported by the shaft portion so that the movable body can perform the reciprocating rotation, and a pair of arm portions respectively extending in opposite directions perpendicular to an axial direction of the shaft portion from the center portion,
  wherein the other one of the coil core portion and the magnet is provided on an end portion of each of the arm portions, and
  wherein the one of the coil core portion and the magnet is provided on the fixed body so as to face the other one of the coil core portion and the magnet,
  wherein the sealed chamber contains a pair of sealed chambers,
  wherein the pair of sealed chambers are disposed side by side along an extending direction of the pair of arm portions,
  wherein the movable wall contains a pair of movable walls,
  wherein the pressing portion has a pair of pushers respectively corresponding to the pair of movable walls, and
  wherein each of the movable walls of the sealed chamber is pressed by the pusher when the arm portions perform reciprocating rotation.

(4) The pump according to the above (3), wherein the discharge ports of the pair of sealed chambers are connected to each other.

(5) The pump according to any one of the above (2) to (4), wherein the pushers are respectively connected to the movable walls.

(6) The pump according to any one of the above (1) to (5), wherein the magnet is provided on one of the movable body and the fixed body and forms a magnetic spring together with the core portion of the coil core portion provided on another one of the movable body and the fixed body.

(7) The pump according to any one of the above (1) to (6), wherein the magnet is magnetized so as to have three magnetic poles, and
  wherein the coil is wound around the core portion of the coil core portion and the core portion of the coil core portion has two magnetic poles facing the magnet in a magnetization direction of the magnet.

(8) The pump according to any one of the above (1) to (6), wherein the magnet is magnetized so as to have four magnetic poles, and
  wherein the coil is wound around the core portion of the coil core portion and the core portion of the coil core portion has three magnetic poles facing the magnet in a magnetization direction of the magnet.

(9) The pump according to any one of the above (1) to (6), wherein the magnet is magnetized so as to have four magnetic poles, and
  wherein three coils are would around the core portion of the coil core portion and the core portion of the coil core portion has three magnetic poles facing the magnet in a magnetization direction of the magnet.

(10) The pump according to any one of the above (1) to (6), wherein the movable body has one end portion axially supported by the shaft portion so that the movable body can perform the reciprocating rotation and another end portion on which the other one of the coil core portion and the magnet is provided,
  wherein the fixed body has the one of the coil core portion and the magnet which faces the other one of the coil core portion and the magnet in a direction perpendicular to a rotational axis of the movable body, and
  wherein the magnet is magnetized so as to have two magnetic poles.

(11) The pump according to the above (10), wherein the core portion has three magnetic poles around which the coil is wound.

(12) The pump according to the above (1) or (2), wherein the movable body has one end portion axially supported by the shaft portion so that the movable body can perform the reciprocating rotation and further contains the coil core portion, and
  wherein the fixed body contains the magnet facing the coil core portion in a direction perpendicular to a rotational axis of the movable body.

(13) An air supply device, comprising: the pump defined by any one of the above (1) to (12).

Effects of the Invention

According to the present invention, it is possible to provide a pump which has a thinner thickness and can secure a high discharge pressure and a larger transfer flow rate.

BRIEF DESCRIPTION OF THE FIGURES

Each of FIG. 9A

Each of FIG. 12A

Each of FIG. 13A

Each of FIG. 39A

DETAILED DESCRIPTION

Hereinafter, description will be given to embodiments of the present invention with reference to the accompanying drawings.

First Embodiment

Figure 1:
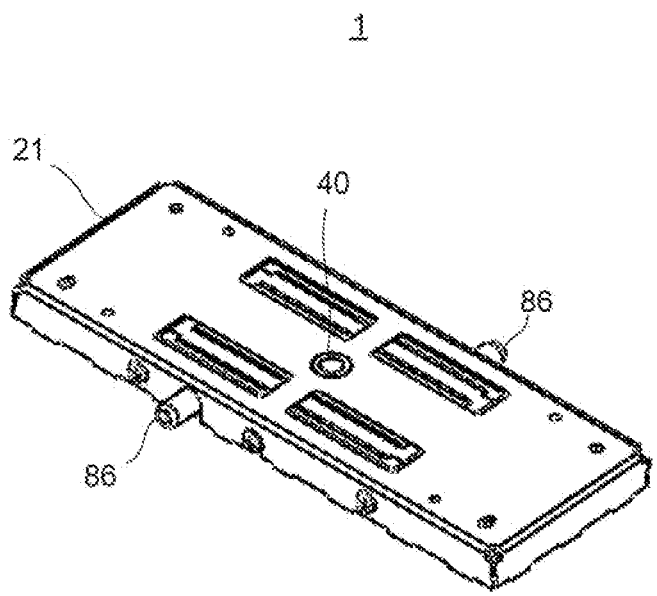
FIG. 1 is an external perspective view of a pump according to a first embodiment of the present invention.
Figure 2:
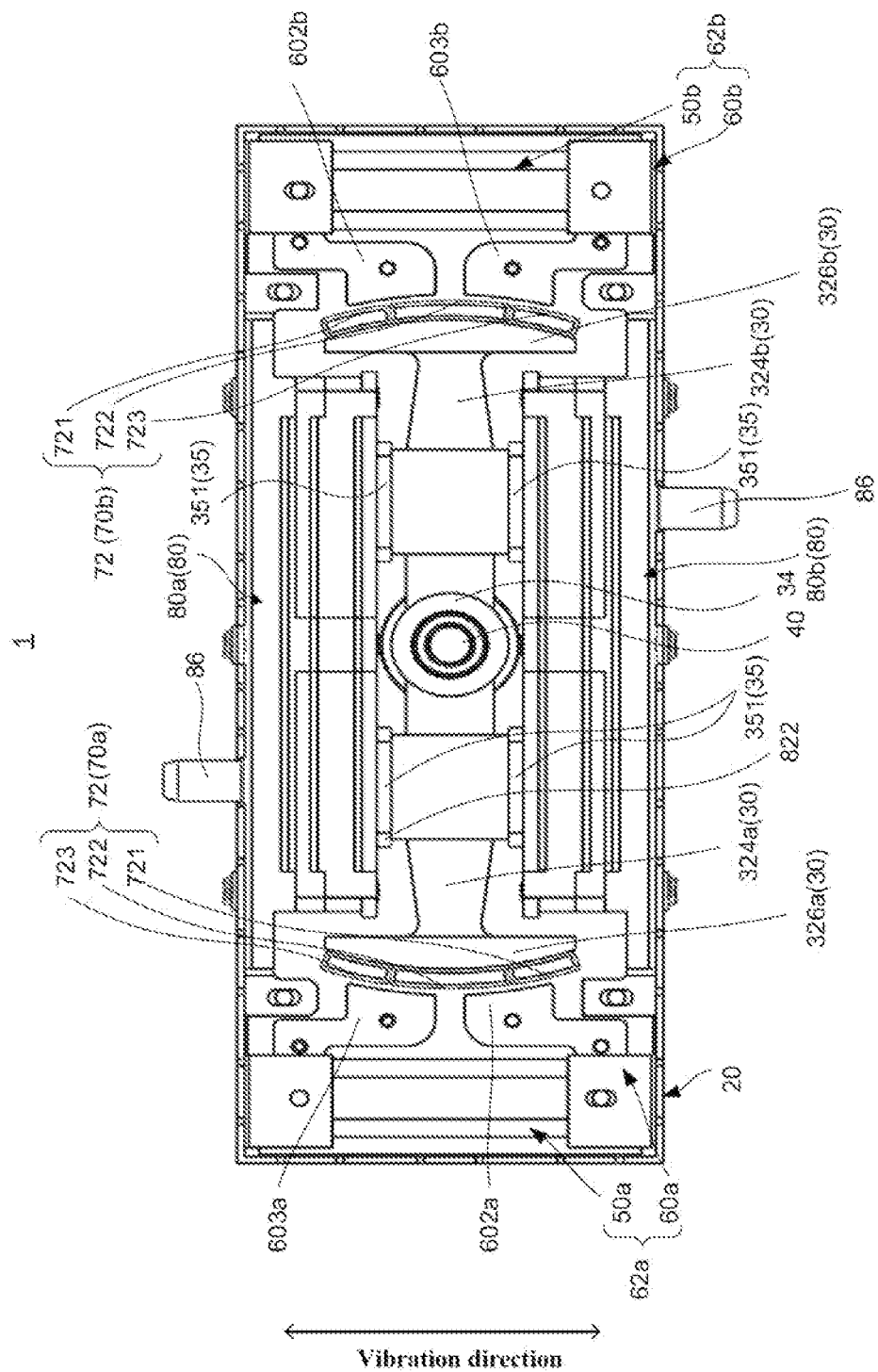
FIG. 2 is a planar view showing a main part configuration of the pump according to the first embodiment of the present invention.
Figure 3:
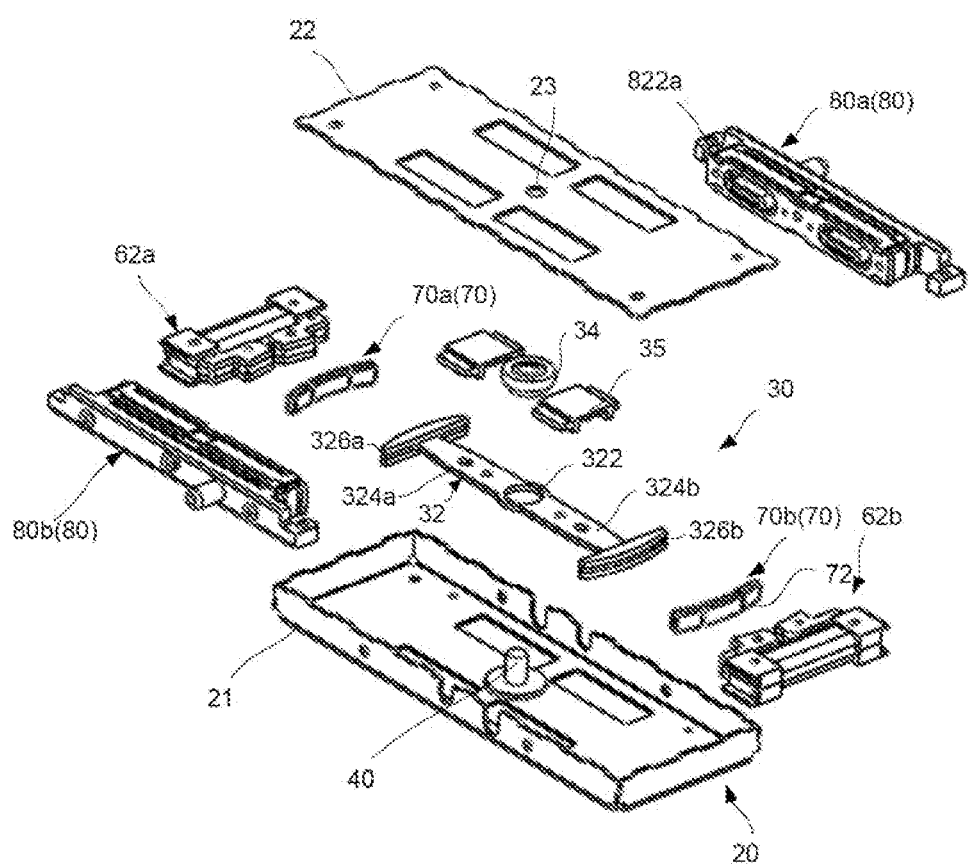
FIG. 3 is an exploded perspective view of the pump according to the first embodiment of the present invention.
Figure 4:
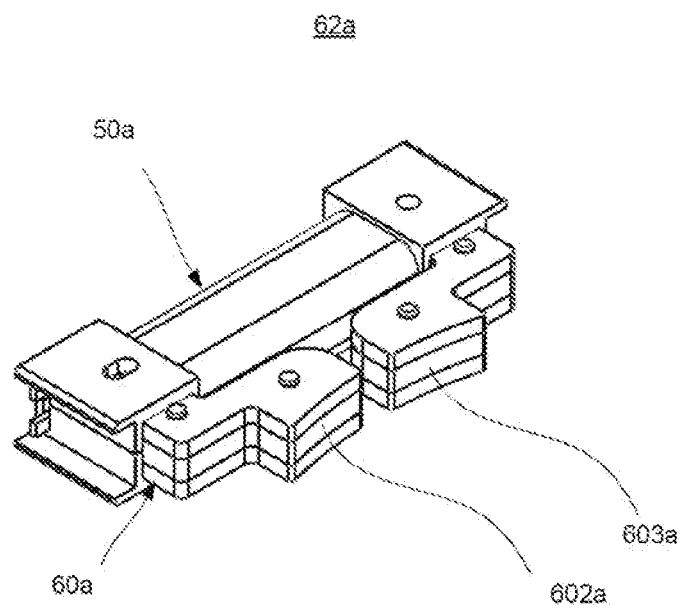
FIG. 4 is a perspective view of a coil core portion in the pump according to the first embodiment of the present invention.
Figure 5:
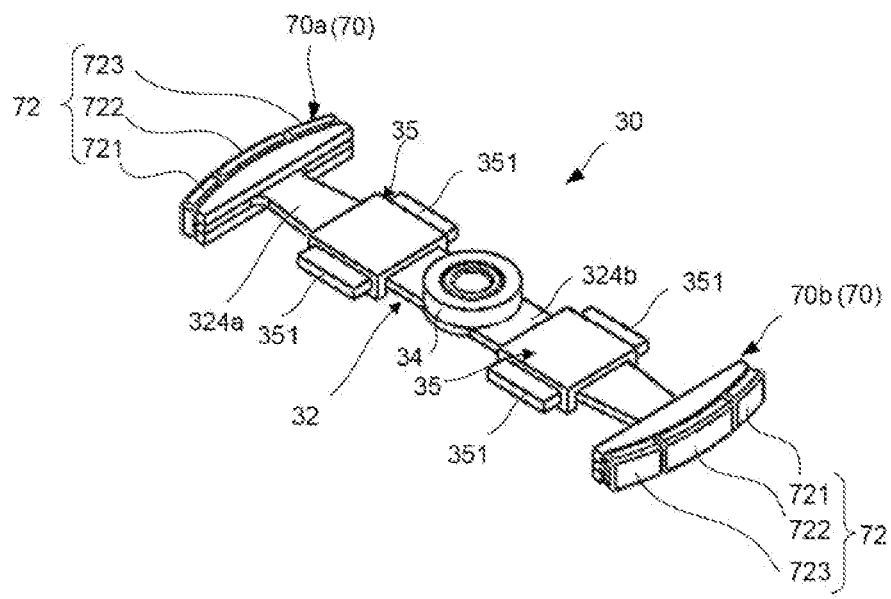
FIG. 5 is a perspective view of a movable body in the pump according to the first embodiment of the present invention.
Figure 6:
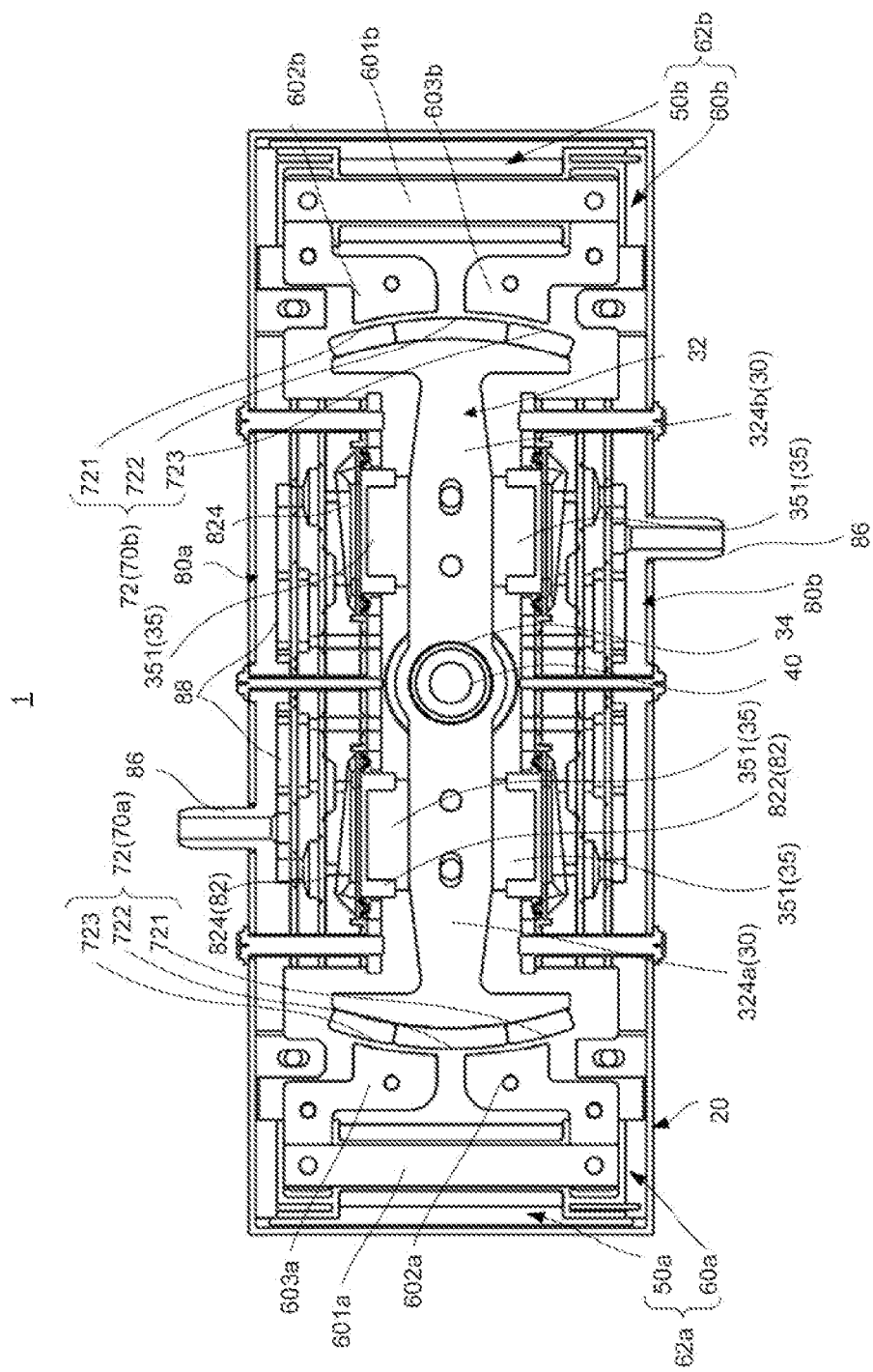
FIG. 6 is a horizontal cross-sectional view showing an internal configuration of the pump according to the first embodiment of the present invention.
Figure 7:
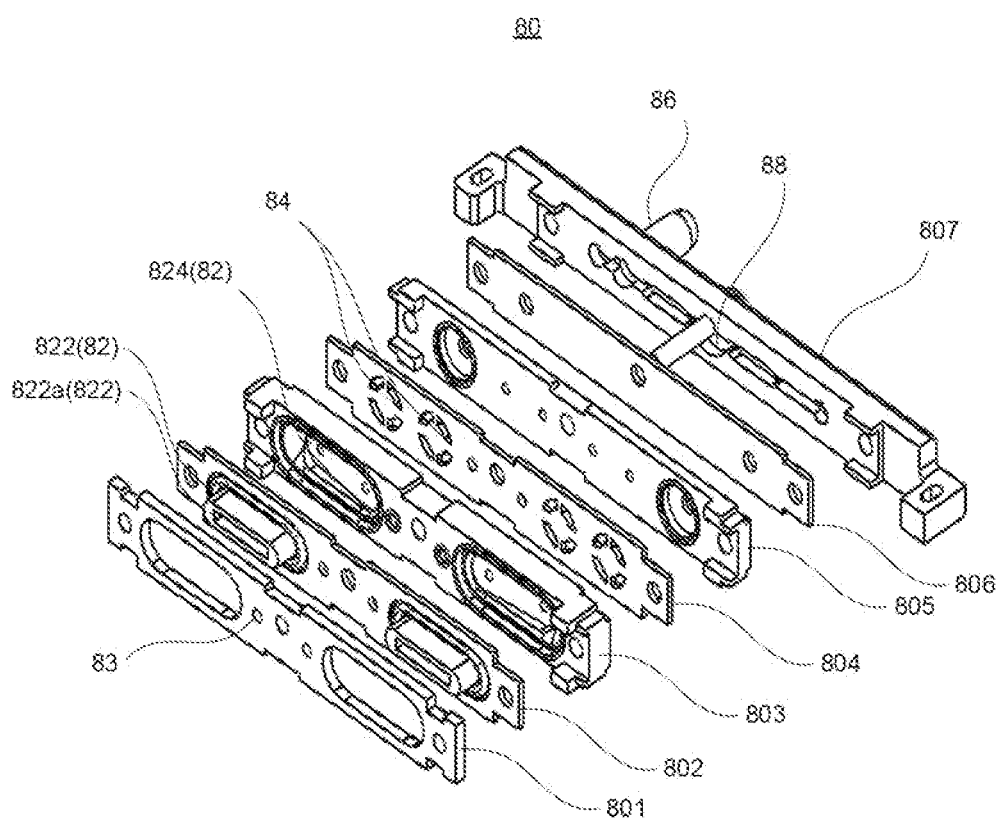
FIG. 7 is an exploded perspective view of a pump unit in the pump according to the first embodiment of the present invention.
Figure 8:
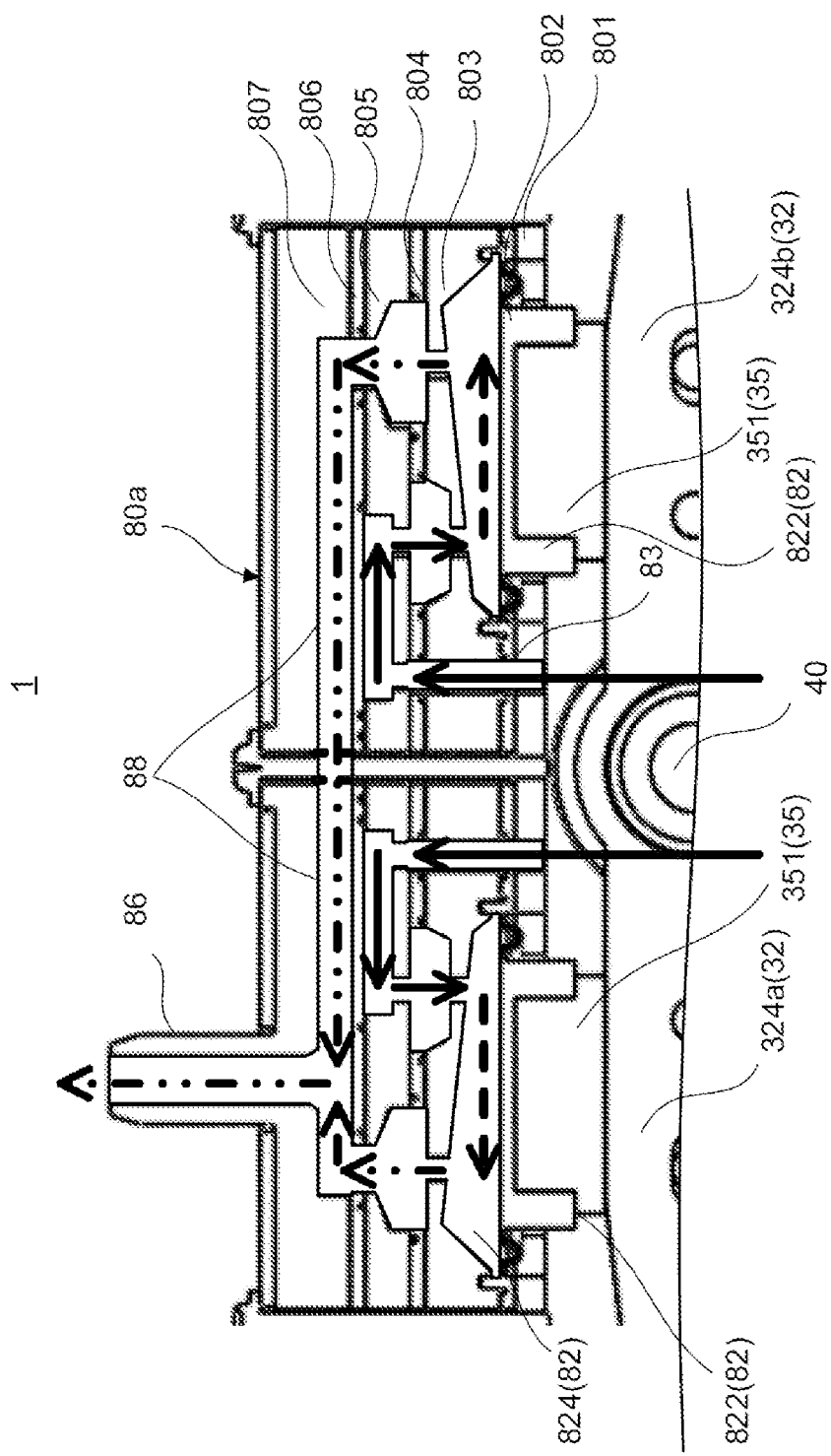
FIG. 8 is a view showing an air flow path of the pump unit of the pump according to the first embodiment of the present invention.

FIG. 1 is an external perspective view of a pump according to a first embodiment of the present invention. FIG. 2 is a planar view showing a main part configuration of the pump according to the first embodiment of the present invention. FIG. 3 is an exploded perspective view of the pump according to the first embodiment of the present invention. FIG. 4 is a perspective view of a coil core portion in the pump according to the first embodiment of the present invention. FIG. 5 is a perspective view of a movable body in the pump according to the first embodiment of the present invention. FIG. 6 is a horizontal cross-sectional view showing an internal configuration of the pump according to the first embodiment of the present invention. FIG. 7 is an exploded perspective view of a pump unit in the pump according to the first embodiment of the present invention.

When description is given to a pump of each embodiment with reference to FIGS. 1 to 7 and FIGS. 8 to 35, it is assumed that a vibration direction of a movable body which performs reciprocating rotation in a vibration actuator of the pump is defined as a direction shown in FIG. 2. The description will be given with assuming that two directions perpendicular to this direction are respectively defined as a horizontal direction (a left-right direction) and a height direction (a vertical direction, also referred to as a thickness direction). Further, in the present embodiment, each expression indicating the directions such as "left-right (lateral)" and "height (vertical)" used to explain a configuration and operation of each part of the pump is not an absolute expression but a relative expression. Although these expressions are appropriate when each part of the pump take a posture shown in each figure, these expressions should be appropriately interpreted depending on the posture of each part of the pump if the posture is changed.

Entire Configuration of Pump 1

A pump 1 shown in FIG. 1 and FIG. 2 is a pump for discharging air by utilizing an action of a vibration actuator 10 which can be electromagnetically driven. Although the description will be given with assuming that the pump has a function of discharging and suctioning air in the present embodiment and each embodiment, a target object to be discharged and suctioned by the pump is not limited to air as long as it is fluid. In particular, it is preferable that the target object to be discharged and suctioned by the pump is gas.

As shown in FIG. 1, the pump 1 has a flat plate-like shape in which a height (a length in the vertical direction in the drawings, which corresponds to a thickness) is shorter than both of a horizontal length (a length in the left-right direction in the drawings) and a vertical length (a length in the depth direction in the drawings, which can be also referred to as the vibration direction). Further, the vertical length is shorter than the horizontal length. In this regard, FIG. 1 is the perspective view of the pump 1 viewed from a rear side thereof.

The pump 1 of the present embodiment includes a vibration actuator 10 in which a movable body 30 is provided so as to freely perform reciprocating rotation with respect to a fixed body 20 through a shaft portion 40 and pump units 80 (80a, 80b) for discharging and suctioning air due to driving of the vibration actuator 10.

In the present embodiment, the movable body 30 is provided in a case 21 of the fixed body 20 through the shaft portion 40 so that the movable body 30 can freely perform the reciprocating rotation.

Due to a collaborative work of core portions 60 (60a, 60b) around which coils 50a, 50b are respectively wound and magnets 70 (70a, 70b), the movable body 30 can reciprocate (that is, vibrate) with respect to the fixed body 20 along an axial direction of the shaft portion 40. The pump 1 can discharge and suction the air through a discharge portion 86 by utilizing vibration of the movable body 30.

In the pump 1 of the present embodiment, the movable body 30 is provided in the case 21 having a rectangular shape in a planar view thereof so that the movable body 30 can freely perform the reciprocating rotation around the shaft portion 40 disposed at a center of the case 21.

The magnets 70a, 70b are respectively provided on the inner surface sides of both wall portions of the case 21 separated from each other in a longitudinal direction of the movable body 30. A coil core portion 62a including the coil 50a and the core portion 60a is provided on an inner surface of the wall portion of the case 21 of the fixed body 20 which faces the magnet 70a. Another coil core portion 62b including the coil 50b and the core portion 60b is provided on an inner surface of the wall portion of the case 21 of the fixed body 20 which faces the magnet 70b. Each of the magnets 70a, 70b is preferably a permanent magnet, for example. Further, it is preferable that each of magnets 70A, 70B, 70C described later is also a permanent magnet.

Vibration Actuator 10

The vibration actuator 10 includes the fixed body 20, the shaft portion 40 and the movable body 30 supported by the shaft portion 40 so that the movable body 30 can freely perform the reciprocating rotation with respect to the fixed body 20. Regarding a configuration of the vibration actuator 10, the magnets 70 (70a, 70b) are provided on one of the fixed body 20 and the movable body 30. Further, the coil core portions 62 (62a, 62b) which are disposed so that magnetized surfaces of cores of each coil core portion 62a, 62b respectively face the magnets 70a, 70b are provided on the other one of the fixed body 20 and the movable body 30. In the present embodiment, the magnets 70a, 70b are provided on the movable body 30 and the coil core portions 62 (62a, 62b) are provided on the fixed body 20. In other words, the movable body 30 includes the magnets 70a, 70b and the fixed body 20 includes the coil core portions 62a, 62b.

Fixed Body 20

The fixed body 20 includes the case 21, a cover 22 and the coil core portions 62a, 62b. Further, the pump units 80 (80a, 80b) are provided on the fixed body 20.

The case 21 serves as a housing of the pump 1 and has a rectangular box-like shape opened to one side. The shaft portion 40 is provided to stand on the case 21 to pivotally support the movable body 30 disposed in the case 21.

In addition, the coil core portions 62a, 62b are respectively disposed on the inner surfaces of both wall portions of the case 21 separated from each other in a longitudinal direction of the case 21 so as to respectively face the magnets 70a, 70b on the movable body 30.

The cover 22 covers an opening portion of the case 21, that is an opening portion opening toward the upper side in the present embodiment. With this configuration, the case 21 and the cover 22 serve as a hollow electromagnetic shield and the pump 1 is formed in a flat plate-like shape.

The shaft portion 40 is provided on a center of a bottom surface of the case 21 in the horizontal direction and the depth direction of the case 21 so as to extend in the height direction of the case 21. The shaft portion 40 is fitted and fixed to a shaft hole 23 of the cover 22 in a state that the shaft portion 40 is passed through a bearing portion 34 of the movable body 30 by press-fitting or bonding after the shaft portion 40 is inserted into the shaft hole 23. With this configuration, the shaft portion 40 is supported in a state that the shaft portion 40 is passed through the bearing portion 34 of the movable body 30 and bridged between the bottom surface of the case 21 and the cover 22.

The coil core portions 62a, 62b are respectively disposed on the inner surfaces of both wall portions of the case 21 separated from each other in the longitudinal direction of the case 21 so as to face each other. Further, the coil core portions 62a, 62b are disposed so as to sandwich the movable body 30 in the longitudinal direction of the case 21.

In the present embodiment, the coil core portions 62a, 62b are configured so as to have the same configuration and respectively provided at positions symmetrical around an axis of the shaft portion 40 in the planar view.

The core portions 60a, 60b are magnetic bodies which can be magnetized when an electrical current flows in the coils 50a, 50b. The core portions 60a, 60b may be made of electromagnetic stainless material, sintered material, metal injection mold (MIM) material, a laminated steel sheet, an electrogalvanized steel sheet (SECC) or the like. In the present embodiment, each of the core portions 60a, 60b is constituted of laminated cores made of the laminated steel sheet.

The core portions 60a, 60b respectively have cores 601a, 601b around which the coils 50a, 50b are respectively wound and magnetic poles (hereinafter, for convenience, referred to as "core magnetic poles") 602a, 603a, 602b, 603b formed continuously with both end portions of the cores 601a, 601b.

In the present embodiment, each of the core magnetic poles 602a, 603a, 602b, 603b has a magnetic pole surface curved so as to have an arc planar shape corresponding to a shape of a magnetized surface of each of the magnets 70a, 70b which can perform reciprocating rotation.

The core magnetic poles 602a, 603a of the core portion 60a face the magnet 70a and the core magnetic poles 602b, 603b of the core portion 60b face the magnet 70b. The core magnetic poles 602a, 603a, 602b, 603b are aligned in a rotation direction of the reciprocating rotation of the movable body 30.

The core magnetic poles 602a, 603a, 602b, 603b are preferably disposed on a circumference of a circle around the shaft portion 40. This circumference is a circumferential track along a movement track of the magnets 70a, 70b.

In the coil core portions 62a, 62b, the core magnetic poles 602a, 603a, 602b, 603b of the core portions 60a, 60b around which the coils 50a, 50b are respectively wound are disposed so as to face a magnetization direction of the magnets 70a, 70b.

The coils 50a, 50b in the core portions 60a, 60b are connected to, for example, a power supply unit (not shown). When the electrical current is supplied from the power supply unit to the coils 50a, 50b, the core magnetic poles 602a, 603a, 602b, 603b are excited. When the core magnetic poles 602a, 603a, 602b, 603b are excited, the core magnetic poles 602a, 602b are excited so as to have a polarity differing from a polarity of the core magnetic poles 603a, 603b in each of the core portions 60a, 60b.

Movable Body 30

As shown in FIG. 2, FIG. 3, FIG. 5 and FIG. 6, the movable body 30 is disposed in the case 21 of the fixed body 20 so as to extend in a direction (the longitudinal direction of the case 21) perpendicular to the shaft portion 40 (the rotational axis of the movable body 30).

The movable body 30 is supported in the case 21 so that the movable body 30 can freely perform the reciprocating rotation around the shaft portion 40. The movable body 30 includes a movable body main portion 32, the bearing portion 34, the pair of magnets 70a, 70b disposed so that the plurality of magnetic poles (three magnetic poles in the present embodiment) of each of the magnets 70a, 70b are alternately disposed in the rotation direction (the depth direction) and pressing portions 35.

The bearing portion 34 is fixed to the movable body main portion 32 and the shaft portion 40 is passed through the bearing portion 34. The pair of magnets 70a, 70b are fixed to the movable body main portion 32 so as to sandwich the shaft portion 40 passed through the bearing portion 34.

The movable body main portion 32 may or may not be a magnetic body (a ferromagnetic body). In the present embodiment, the movable body main portion 32 is a yoke and serves as a weight of the movable body 30. The movable body main portion 32 is constituted by laminating yoke iron cores, for example. The constituent material of the movable body main portion 32 is not limited to metal material. Resin material or the like may be used as the constituent material of the movable body main portion 32.

The movable body main portion 32 has a center opening portion 322 formed at a center portion of the movable body main portion 32 and to which the bearing portion 34 is fixed and arm portions 324a, 324b respectively extending in opposite directions from the center portion. Each of the arm portions 324a, 324b has an elongated flat plate-like shape and end portions of the arm portions 324a, 324b are formed so as to protrude in a direction perpendicular to the extending direction. Further, magnet fixing portions 326a, 326b are respectively formed on tip end surfaces of the arm portions 324a, 324b.

A tip end surface of each of the magnet fixing portions 326a, 326b is formed to be curved in an arc shape. The magnets 70a, 70b are respectively fixed to the tip end surfaces of the magnet fixing portions 326a, 326b. The pressing portions 35 are respectively provided on the arm portions 324a, 324b.

Magnets 70a, 70b

The magnets 70a, 70b constitute magnetic circuits for driving the vibration actuator 10 together with the coil core portion 62a, 62b which are disposed to respectively face the magnets 70a, 70b.

Each of the magnets 70a, 70b has a magnetic pole surface 72 serving as a plurality of magnetic poles. The magnets 70a, 70b are disposed so that the magnetic pole surface 72 of the magnet 70a and the magnetic pole surface 72 of the magnet 70b are directed toward opposite sides through the shaft portion 40. In the present embodiment, the magnets 70a, 70b are respectively provided on both end portions of the movable body main portion 32 through which the shaft portion 40 is passed through at the center portion thereof. The end portions of the movable body main portion 32 are separated from each other in the extending direction of the movable body main portion 32. Namely, the magnets 70a, 70b are respectively provided on tip end portions of the arm portions 324a, 324b so that the magnetic pole surfaces 72 of the magnets 70a, 70b are directed toward the outside.

As shown in FIGS. 2, 3, 5, 6 and FIG. 10, the magnetic pole surface 72 contains three different magnetic poles 721, 722, 723 alternately disposed. In this regard, each of the magnets 70a, 70b may be configured by alternately arranging magnets (magnet pieces) having different magnetic poles or may be magnetized so as to have different magnetic poles alternately disposed in the rotation direction. The same discussion can be applied to magnets of the respective embodiments described later. The magnets 70a, 70b are constituted of, for example, Nd sintered magnets or the like.

The magnetic poles 721, 722, 723 of each of the magnets 70a, 70b are disposed so as to be adjacent to each other in the depth direction perpendicular to an axis line of the shaft portion 40 through the shaft portion 40, that is, in the rotation direction.

The magnets 70a, 70b are respectively disposed on both end portions of the movable body 30 so that the magnetic pole surfaces 72 of the magnets 70a, 70b are positioned on the circumference of the circle around the shaft portion 40. The magnets 70a, 70b are provided so that a center position of a length of the center magnetic pole 722 of each of the magnetic pole surfaces 72 in the rotation direction is positioned at a center position between the core magnetic poles 602a, 603a in a normal state, that is, in a non-energization state that the electrical current is not supplied into the coils 50a, 50b.

In the present embodiment, the magnets 70a, 70b are disposed on the movable body 30 so as to respectively face the coil core portions 62a, 62b respectively provided on the inner surfaces of both wall portions of the housing (the case 21) and at positions which are farthest apart from the shaft portion 40 through the arm portions 324a, 324b.

Pressing Portion 35

The pressing portions 35 press movable walls 822 of a pair of sealed chambers 82 of the pump units 80 when the movable body 30 performs rotational movement. Specifically, each of the pressing portions 35 includes a pair of pushers 351 for pressing the movable walls 822 of the pair of the sealed chambers 82 when the arm portions 324a, 324b perform the reciprocating rotation.

The pairs of pushers 351 of the pressing portions 35 are respectively provided on the arm portions 324a, 324b so as to protrude in the width direction, that is, in the rotation direction of the arm portions 324a, 324b. Each of the pressing portions 35 may be formed so as to linearly press the movable wall 822 in a facing direction even when the movable body 30 rotates, for example. In the present embodiment, each pusher 351 of the pressing portions 35 moves in an arc track around the shaft portion 40 and abuts against the movable wall 822 to press the movable wall 822. The pressing portion 35 may be configured in any manner as long as it is configured to be displaced toward the movable wall side when the movable body 30 performs the rotational movement to press and move the movable wall 822. Preferably, the movable wall 822 is disposed so as to intersect a movement track of the pressing portion 35 and the moving pressing portion 35 is disposed so as to make surface-contact with the movable wall 822.

Figure 9A:
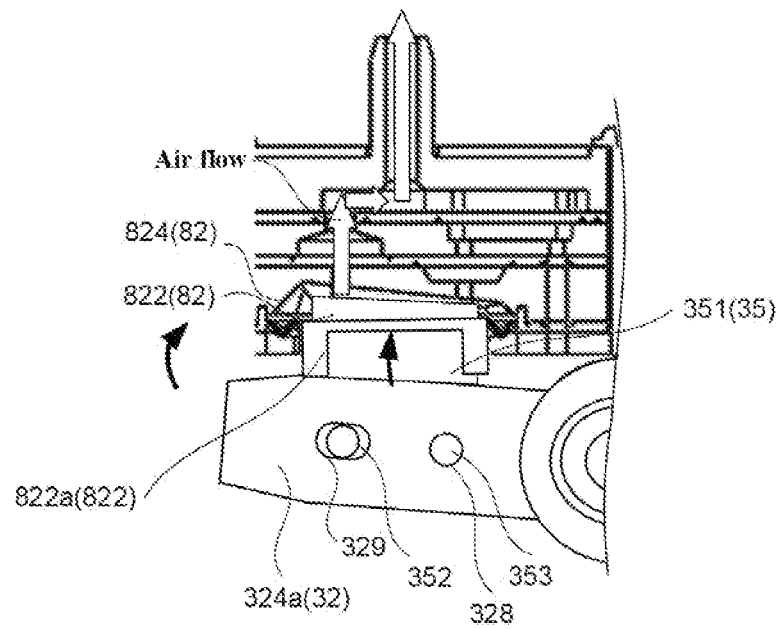
FIG. 9B is a view illustrating a discharge and suction operation for air in the pump according to the first embodiment of the present invention.
Figure 9B:
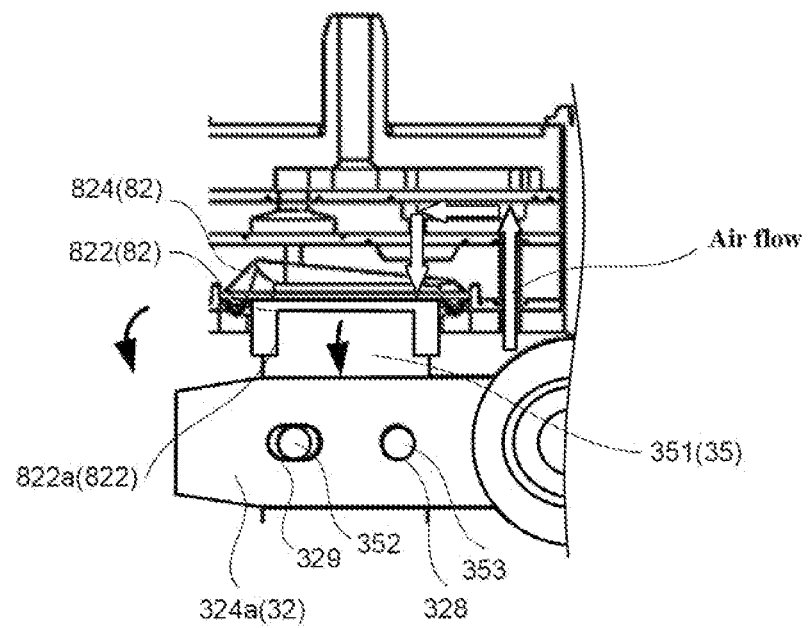

For example, as shown in each of FIG. 9A and FIG. 9B, the pressing portion 35 is fixed with respect to each of the arm portions 324a, 324b through a shaft protrusion 353 axially attached to a round hole 328 so that the shaft protrusion 353 can perform pivotal movement and a guide protrusion 352 guided by a long hole 329.

With this configuration, the pusher 351 swings in the arc track when the movable body 30 performs the reciprocating rotation. For example, a tip end of the pusher 351 may swing by loosely fitting the guide protrusion 352 into the long hole 329 to allow the pressing portion 35 to swing with respect to the arm portions 324a, 324b through the guide protrusion 352. In this case, although the pressing portion 35 moves in the arc track when the movable body 30 rotates, the pusher 351 can linearly move with respect to the movable wall 822 to press the movable wall 822.

In the present embodiment, the pressing portion 35 is connected to the movable wall 822 of the pump unit 80 through the pusher 351. The pusher 351 is inserted into an insertion portion 822a of the movable wall 822 serving as a diaphragm when the movable body 30 performs the rotational movement to push and displace the movable wall 822 in the rotation direction. The pressing portion 35 moves toward the side of the movable wall 822 to press the movable wall 822 when the movable body 30 rotates. Further, when the movable body 30 oppositely rotates, the pressing portion 35 moves toward the side opposite to the movable wall 822 and gradually decreases pressure with respect to the movable wall 822 to displace the movable wall 822 in a direction opposite to the pressing direction.

The bearing portion 34 is constituted of a sintered sleeve bearing, for example. The bearing portion 34 is fitted into the center opening portion 322 of the movable body main portion 32 so that the shaft portion 40 is positioned on a center axis of the movable body main portion 32.

When the electrical current is not supplied to the coils 50a, 50b, the movable body main portion 32 is biased so as to be positioned at a center of the case 21 (the fixed body 20) in longitudinal direction by functions of magnetic springs provided by the core portions 60a, 60b and the magnets 70a, 70b.

Pump Unit 80

Each of the pump units 80 (80a, 80b) includes the movable walls 822, the sealed chambers 82 defined by the movable walls 822, a suction portion 83, valves 84, the discharge portion 86 and a discharge flow path portion 88.

Movable Wall 822

The movable wall 822 forms a wall portion for partitioning between a chamber forming portion 824 and the discharge flow path portion 88 and is provided so as to be displaceable. The movable wall 822 is displaced to change a volume in the sealed chamber 82. The movable wall 822 constitutes the sealed chamber 82 together with the chamber forming portion 824.

The movable wall 822 is formed of, for example, elastically deformable material and is provided so as to close the chamber forming portion 824. For example, the movable wall 822 is a diaphragm.

The movable wall 822 has the insertion portion 822a into which the pusher 351 of the pressing portion 35 is inserted and is connected to the pressing portion 35 through the insertion portion 822a. The movable wall 822 is displaced when the movable wall 822 is pressed by the pressing portion 35 which moves in accordance with the rotation of the movable body 30.

The movable wall 822 is elastically deformed when the movable wall 822 is pressed toward the chamber forming portion 824 by the pressing portion 35 through the insertion portion 822a and deformed to reduce a volume of the chamber forming portion 824. Since the movable wall 822 is displaced toward the chamber forming portion 824 and protrudes into the chamber forming portion 824, the movable wall 822 can change the volume in the sealed chamber 82.

The movable wall 822 is inserted into the chamber forming portion 824 by one-side rotation movement (swing to one side of the rotation direction) of the reciprocating rotation of the movable body 30 to press the inside of the chamber forming portion 824 and reduce the volume in the sealed chamber 82 for discharging the air. On the other hand, when the movable body 30 rotates in the other side (moves toward the other side of the rotation direction), the movable wall 822 increases the volume in the sealed chamber 82 to suction the air.

Sealed Chamber 82

The sealed chamber 82 is a sealed space to which the suction portion 83 and the discharge portion 86 are connected and whose volume can be changed by the displacement of the movable wall 822. The discharge portion 86 has a discharge port communicated with the outside and discharges the air from the pump 1 to the outside through the discharge port. For example, the discharge port may be an opening communicated with the discharge portion 86 connected to a bottom surface of the sealed chamber 82.

In the pump unit 80, when the movable wall 822 is pressed by the pressing portion 35, the movable wall 822 is elastically deformed toward the inside of the sealed chamber 82 to press the air in the sealed chamber 82. The pressed air in the sealed chamber 82 is discharged to the outside through the discharge portion 86. When the movable wall 822 moves so as to return to an initial position, that is, when the pressed state by the pressing portion 35 is released and the volume in the sealed chamber 82 increases from the pressed state, the air is suctioned from the outside into the sealed chamber 82 through the suction portion 83. For example, the suction portion 83 has a suction port and can suction the air into the sealed chamber 82 through the suction port. For example, the suction port may be an opening communicated with the suction portion 83 in the chamber forming portion 824.

Each of the pump units 80 (80a, 80b) is disposed in the case 21 along the extending direction of the movable body 30, that is, along side wall portions of the case 21 extending in the longitudinal direction of the case 21. Further, the pump units 80 (80a, 80b) are disposed so as to sandwich the movable body main portion 32 of the movable body 30 in the depth direction of the case 21.

For example, the pump unit 80 includes a base 801, a diaphragm portion 802, a cylinder portion 803, a valve portion 804, a valve cover portion 805, a partition portion 806 and a flow path forming portion 807. Each of the base 801, the diaphragm portion 802, the cylinder portion 803, the valve portion 804, the valve cover portion 805, the partition portion 806 and the flow path forming portion 807 has an elongated plate-like shape extending in the longitudinal direction of the case 21 and constitutes the pump unit 80 having an internal space sealed by stacking these portions.

The base 801 has an opening. The insertion portion 822a of the diaphragm portion 802 is passed through the opening of the base 801 from a rear surface side of the base 801 so as to protrude toward a front surface side of the base 801. The base 801 and the flow path forming portion 807 constitute a housing of the pump unit 80 having a strip shape.

The diaphragm portion 802 is formed from elastic material such as rubber. The diaphragm portion 802 has the insertion portion 822a and the movable wall 822. The chamber forming portion 824 of the cylinder portion 803 is disposed on the rear surface side of the movable wall 822 which has flexibility and can be elastically deformed. The diaphragm portion 802 and the cylinder portion 803 are attached to each other so that the movable wall 822 of the diaphragm portion 802 and the chamber forming portion 824 of the cylinder portion 803 define the sealed chamber 82 which is a sealed space.

The cylinder portion 803 has the chamber forming portion 824 and two communication holes formed in a surface facing the movable wall 822 in the sealed chamber 82 so as to be respectively communicated with the discharge portion 86 and the suction portion 83. The two communication holes are respectively connected to the discharge flow path portion 88 and the suction portion 83 of the flow path forming portion 807 and the valve cover portion 805 through the valves 84 of the valve portion 804 which are attached from the rear surface side of the cylinder portion 803 so as to overlap with the two communication holes.

The valve portion 804 is attached to the valve cover portion 805. The valve 84 connected to the discharge portion 86 is configured to communicate with the discharge portion 86 of the flow path forming portion 807 when the volume in the sealed chamber 82 decreases. On the other hand, the valve 84 connected to the discharge portion 86 is configured to be closed when the volume in the sealed chamber 82 increases.

The valve portion 804 is attached to the valve cover portion 805. The valve 84 connected to the suction portion 83 is configured to be closed when the volume in the sealed chamber 82 decreases. On the other hand, the valve 84 connected to the suction portion 83 is configured to communicate with the suction portion 83 of the flow path forming portion 807 when the volume in the sealed chamber 82 increases.

In the present embodiment, each of the pump units 80 (80a, 80b) has the pair of sealed chambers 82 each constituted of the chamber forming portion 824 and the movable wall 822. Each of the pump units 80 (80a, 80b) is disposed so that its own pair of sealed chambers 82 respectively face side surfaces of the arm portions 324a, 324b extending in directions opposite to each other through the shaft portion 40. Namely, the pump units 80 (80a, 80b) are disposed so as to face each other at positions where the arm portions 324a, 324b are sandwiched between the pairs of sealed chambers 82 of the pump units 80 (80a, 80b) in the direction of the reciprocation and rotation movement of the arm portions 324a, 324b.

Each of FIG. 9A and FIG. 9B is a view showing an air discharge operation or an air suction operation of the pump according to the first embodiment of the present disclosure.

When the pressing portion 35 moves toward the movable wall 822, the pusher 351 contacts and presses the movable wall 822 through the insertion portion 822a as shown in FIG. 9A. As a result, the movable wall 822 is displaced toward the side of the chamber forming portion 824 and thus the air in the sealed chamber 82 is pressed and compressed. The compressed air flows to the side of the discharge portion 86 which is only one communicated with the sealed chamber 82 through the opened valve 84 (see white arrows in FIG. 9A).

On the other hand, when the pressing portion 35 reversely moves in the rotation direction, that is, moves away from the side of the pump unit 80, the movable wall 822 elastically returns in accordance with the movement of the pressing portion 35 and the volume in the sealed chamber 82 is returned, that is, increased as shown in FIG. 9B. At this time, the valve 84 connected to the discharge portion 86 is tightened to close the discharge path and the valve 84 connected to the suction portion 83 is opened. Thus, the air is suctioned into the sealed chamber 82 through the suction portion 83 (indicated by white arrows in the FIG. 9B).

Magnetic Circuit Configuration

In the present embodiment, the core portions 60a, 60b which are magnetic members are disposed in the case 21 so as to respectively face the magnets 70a, 70b with being apart from the magnets 70a, 70b in the longitudinal direction as shown in FIG. 2 and FIG. 6. The magnets 70a, 70b are respectively disposed at both ends of the movable body 30 so as to face each other through the shaft portion 40. The core portions 60a, 60b are respectively disposed on inner surfaces of both wall portions of the case 21 in the longitudinal direction so as to face each other with being apart from each other in the longitudinal direction.

Magnetic attraction force is generated between the core portion 60a and the magnet 70a and between the core portion 60b and the magnet 70b. Since these two kinds of magnetic attraction force generated in the longitudinal direction (the extending direction of the arm portion 324a, 324b) are generated in opposite directions on one straight line through the shaft portion 40, these two kinds of magnetic attraction force cancel each other.

Figure 10:
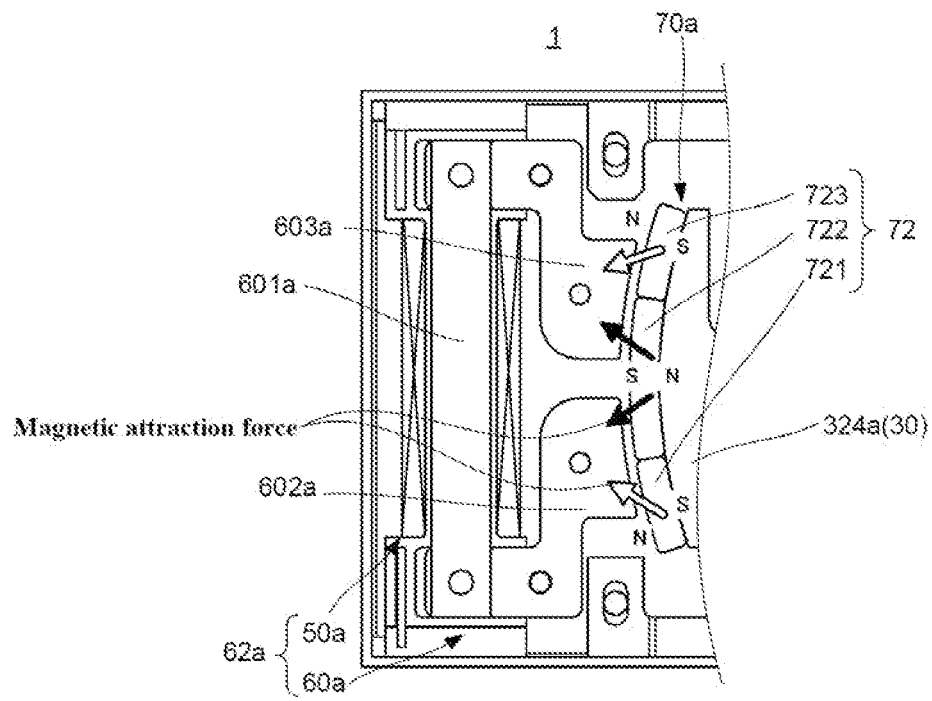
FIG. 10 is a view showing a magnetic spring of the pump according to the first embodiment of the present invention.

FIG. 10 is a view showing a magnetic spring of the pump unit according to the first embodiment of the present invention. In the pump 1, a magnetic circuit provided by the coil core portion 62a and the magnet 70a and a magnetic circuit provided by the coil core portion 62b and the magnet 70b are configured to be point-symmetrically around the shaft portion 40. Thus, only the magnetic circuit provided by the coil core portion 62a and the magnet 70a will be described in FIG. 10 and description for the magnetic circuit provided by the coil core portion 62b and the magnet 70b will be omitted.

In FIG. 10, the magnet 70a has a configuration in which the magnetic poles 721, 722, 723 on the magnetic pole surface 72 facing the core portion 60a are respectively magnetized as N pole, S pole and N pole. Each of the magnetic poles 721 to 723 on the magnetic pole surface 72 of the magnet 70a respectively attracts the core magnetic poles 602a, 603a close to each of the magnetic poles 721 to 723.

The center magnetic pole 722 of the magnet 70a attracts both of the core magnetic poles 602a, 603a. The magnetic pole 721 of the magnet 70a attracts the core magnetic pole 602a. The magnetic pole 723 of the magnet 70a attracts the core magnetic pole 603a. As a result, the center magnetic pole 722 of the magnet 70a is located at the center of the coil core portion 62a, that is, at a position between the core magnetic poles 602a, 603a.

In the pump 1, when the electrical current flows in the coil 50*a* of the coil core portion 62*a*, the core magnetic poles 602*a*, 603*a* of the core portion 60*a* are excited with different polarities. As a result, thrust force is generated with respect to the movable body 30 in accordance with the relationship with the magnet 70*a* disposed so as to face the coil core portion 62*a*. The same discussion can be applied to the magnetic circuit provided by the coil core portion 62*b* and the magnet 70*b*. By periodically changing the direction of the electric current supplied to the coils 50*a*, 50*b*, the movable body 30 including the magnets 70*a*, 70*b* performs the reciprocating rotational movement (reciprocating rotational vibration) in the rotation direction around the shaft portion 40.

Operation of Pump 1

Figure 11:
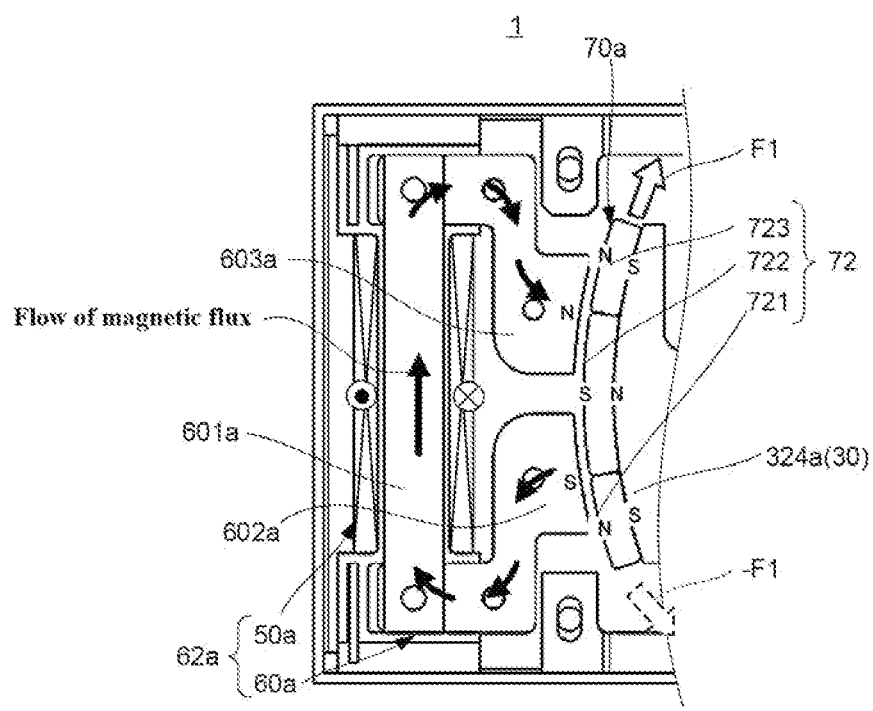
FIG. 11 is a view showing a configuration of a magnetic circuit of the pump according to the first embodiment of the present invention.

An example of the operation of the pump 1 will be described with reference to FIG. 11. FIG. 11 is a view showing the magnetic circuit configuration of the pump according to the first embodiment of the present invention. In this regard, similarly to the description with reference to FIG. 10, only the magnetic circuit provided by the coil core portion 62*a* and the magnet 70*a* will be described in the description for the example of the operation of the pump 1 with reference to FIG. 11 and description for the magnetic circuit provided by the coil core portion 62*b* and the magnet 70*b* will be omitted.

It is assumed that the magnet 70*a* has three different polarities on the magnetic pole surface 72 so that the three different polarities are alternately arranged in the rotation direction. In the magnet 70*a* shown in FIG. 11, the central magnetic pole 722 is the S pole and each of the magnetic poles 721, 723 sandwiching the center magnetic pole 722 is the N pole on the magnetic pole surface 72 facing the core portion 60*a*.

When the electrical current is supplied to the coil 50*a* of the coil core portion 62*a* to excite the core portion 60*a*, the core magnetic pole 602*a* of the core portion 60*a* is magnetized with the S pole and the core magnetic pole 603*a* of the core portion 60*a* is magnetized with the N pole as shown in FIG. 11.

Since the magnetic pole 723 of the magnet 70*a* magnetized with the N pole faces the core magnetic pole 603*a* magnetized with the N pole as shown in FIG. 11, the magnetic pole 723 of the magnet 70*a* repels with respect to the core magnetic pole 603*a*. In addition, since the magnetic pole 722 of the magnet 70*a* is magnetized with the S pole, magnetic attraction force is generated between the magnetic pole 722 and the core magnetic pole 603*a* magnetized with the N pole and the magnetic pole 722 repels with respect to the core magnetic pole 602*a* magnetized with the S pole. Further, since the magnetic pole 721 of the magnet 70*a* is magnetized with the N pole, magnetic attraction force is generated between the magnetic pole 721 and the core magnetic pole 602*a* magnetized with the S pole.

With this configuration, thrust force in the direction F1 is generated between the magnet 70*a* and the coil core portion 62*a*, and thereby the movable body 30 is driven in the direction F1.

In a state that the electrical current is not supplied to the coil 50*a*, the movable body 30 is located at a rotation reference position, that is a neutral position for the reciprocation movement by the magnetic attraction force of the magnetic spring.

Further, the electrical current is supplied to the coil 50*a* in the opposite direction to reverse the polarity of the core portion 60*a*. Namely, the magnetic pole 603*a* of the core portion 60*a* facing the magnet 70*a* is magnetized with the S pole and the magnetic pole 602*a* of the core portion 60*a* is magnetized with the N pole. As a result, the magnet 70*a* facing the core portion 60*a* rotates in a direction (direction −F1) opposite to the direction F1. The movable body 30 is driven in the direction −F1 which is 180 degrees opposite to the direction F1.

In the movable body 30, the relationship between the magnet 70*b* disposed on the opposite side of the magnet 70*a* through the shaft portion 40 and the coil core portion 62*b* is point-symmetrical with respect to the relationship between the magnet 70*a* and the coil core portion 62*a* around the shaft portion 40. Thus, thrust force in the direction F1 or the direction −F1 is also generated between the magnet 70*b* and the coil core portion 62*b* similar to the thrust force generated between the magnet 70*a* and the coil core portion 62*a*. With this configuration, the movable body 30 preferably performs the reciprocating rotation around the shaft portion 40 due to the magnetic attraction force and the repulsion force which are effectively generated in the magnetic circuits at both end portions of the movable body 30.

This driving principle will be described in the following description. The driving principle of the vibration actuator 10 of the present embodiment is realized by all of the vibration actuators used in the following embodiments.

In the vibration actuator 10 of the present embodiment, when an inertial moment of the movable body 30 is defined as J [Kg*m$^2$] and a spring constant in the rotation direction is defined as K$_{sp}$, the movable body 30 vibrates with respect to the fixed body 20 with a resonant frequency fr [Hz] calculated by the following equation (1).

Equation 1

$$f_r = \frac{1}{2\pi}\sqrt{\frac{K_{sp}}{J}} \quad (1)$$

In the pump 1 of the present embodiment, an alternating current having a frequency substantially equal to the resonant frequency fr of the movable body 30 is supplied to the coils 50*a*, 50*b* to excite the core portions 60*a*, 60*b* (more specifically, the core magnetic poles 602*a*, 603*a*, 602*b*, 603*b*) with the coils 50*a*, 50*b*. As a result, it is possible to efficiently drive the movable body 30.

The movable body 30 in the vibration actuator 10 of the present embodiment is in a state that it is supported by a spring mass system structure constituted of the magnetic springs provided by the magnets 70*a*, 70*b* and the coil core portions 62*a*, 62*b* respectively having the coils 50*a*, 50*b* and the core portions 60*a*, 60*b*. Thus, when the alternating current having the frequency equal to the resonance frequency fr of the movable body 30 is supplied to the coils 50*a*, 50*b*, the movable body 30 is driven in a resonance condition.

A motion equation and a circuit equation representing the driving principle of the vibration actuator 10 are shown below. The vibration actuator 10 is driven based on the motion equation expressed by the following equation (2) and the circuit equation expressed by the following equation (3).

Equation 2

$$J\frac{d^2\theta(t)}{dt^2} = K_f i(t) - K_{sp}\theta(t) - D\frac{d\theta(t)}{dt} \quad (2)$$

J: Inertial moment [Kg*m²]
θ(t): Displacement angle [rad]
$K_f$: Thrust constant [Nm/A]
i(t): Current [A]
$K_{sp}$: Spring constant [Nm/rad]
D: Damping coefficient [Nm/(rad/s)]

$$e(t) = Ri(t) + L\frac{di(t)}{dt} + K_e \frac{dx(t)}{dt} \qquad \text{Equation 3}$$

e(t): Voltage [V]
R: Resistance [Ω]
L: Inductance [H]
$K_e$: Counter-electromotive force constant [V/(m/s)]

Namely, the inertial moment J [Kg*m²], a displacement angle (rotational angle) θ(t) [rad], a thrust constant (torque constant) $K_f$ [Nm/A], an electrical current i(t) [A], the spring constant $K_{sp}$ [Nm/rad], a damping factor D [Nm/(rad/s)] and the like of the movable body 30 in the vibration actuator 10 of the pump 1 can be appropriately changed as long as they satisfy the equation (2). A voltage e(t) [V], a resistance R [Ω], an inductance L[H] and a counter-electromotive force constant $K_e$ [V/(m/s)] can be appropriately changed as long as they satisfy the equation (3).

As described above, when the alternating current having the frequency corresponding to the resonance the resonant frequency fr determined by the inertial moment J of the movable body 30 and the spring constant $K_{sp}$ of the magnetic spring is supplied to the coils 50a, 50b, it is possible to efficiently obtain a large vibration output of the vibration actuator 10 of the pump 1.

In the pump 1, the volume in the sealed chamber 82 is changed by the displacement of the movable wall 822 (specifically, the deformation of the diaphragm) in the pump unit 80 when the movable body 30 performs the reciprocating rotation. Thus, the pump 1 can provide a pump function. In the following description, a flow rate of this pump function is set by the following equation (4) and pressure of this pump function is set by the following equation (5).

Equation 4

$$Q = Axf*60 \qquad (4)$$

Q: Flow rate [L/min]
A: Piston area [m²]
x: Piston displacement [m]
f: Drive frequency [Hz]

Equation 5

$$P = P_0\left(\frac{V + \Delta V}{V - \Delta V} - 1\right) \qquad (5)$$

P: Increased pressure [kPa]
$P_0$: Atmospheric pressure [kPa]
V: Sealed chamber volume [m³]
ΔV: Changed volume [m³]

ΔV=Ax

A: Piston area [m²]
x: Piston displacement [m]

Namely, a flow rate Q [L/min], a piston area A [m²], a piston displacement x [m], a drive frequency f [Hz] and the like of the pump 1 can be appropriately changed as long as they satisfy the equation (4). Further, an increasing pressure [kPa], an atmospheric pressure $P_0$ [kPa], a sealed chamber volume V [m³] and a changed volume ΔV [m³]=the piston area [m²] A*the piston displacement [m] can be appropriately changed as long as they satisfy the equation (5).

As described above, the pump 1 of the present embodiment has the vibration actuator 10 which can be electromagnetically driven and the pump units 80 (80a, 80b) which suction and discharge the air due to the electromagnetic drive of the vibration actuator 10.

In the vibration actuator 10, the fixed body 20 includes one of the coil core portion 62a having the coil 50a and the core portion 60a around which the coil 50a is wound and the magnet 70a disposed so as to face the end portion of the core portion 60a. Further, the pump units 80 (80a, 80b) are provided on the fixed body 20. The movable body 30 includes the other one of the coil core portion 62a and the magnet 70a. Further, the movable body 30 is elastically held by the magnetic attraction force of the magnet 70a. The shaft portion 40 reciprocally and rotatably supports the movable body 30. The pump unit 80a includes the movable wall 822 which can be moved by the rotational movement of the movable body 30 and the sealed chamber 82 which communicates with the discharge portion 86 for the air and the suction portion 83 for the air and whose volume can be changed by the displacement of the movable wall 822. The movable body 30 has the pressing portions 35 which move in the arc track around the shaft portion 40 when the movable body 30 performs the reciprocating rotational movement and contact with the movable wall 822 to press the movable wall 822. The movable walls 822 are disposed in the moving direction of the pressing portions 35 and displaced to discharge the air in the sealed chamber 82 through the discharge portion 86 when the movable walls 822 are pressed by the pressing portion 35.

Effect

The movable body 30 elastically supported by the magnetic springs provided by the magnets 70a, 70b and the coil core portions 62a, 62b vibrates with high efficiency due to the resonance.

Namely, as compared with a case that a rotary motor is utilized as a driving component of a pump, it is possible to reduce the thickness of the pump. Further, unlike a conventional pump using a piezoelectric element and whose performance is specialized in either one of the pressure or the flow rate, it is possible to set both of a desired pressure and a desired flow rate when discharging the air.

In addition, in the normal condition of the movable body 30, the sealed chambers 82 of the pump units 80a, 80b are disposed so as to face each other in the direction perpendicular to the extending direction of the movable body 30 with sandwiching the pressing portions 35 of the movable body 30 from both sides of the reciprocating rotational movement. With this configuration, even when the movable body 30 is in the normal condition, that is when the movable body 30 is located at the reference position and the pressing portions 35 are respectively pressed toward the direction for moving the pressing portions 35 away from the sealed chambers 82 by the air remaining in the sealed chambers 82 of the pump units 80a, 80b, the pressing force respectively applied to the pressing portions 35 by the air remaining in the sealed chambers 82 of the pump units 80a, 80b cancels each other. Therefore, it is possible to suitably locate the movable body 30 at the reference position for the reciprocating rotational movement.

Regarding a pump unit of a conventional pump, there is a possibility that the reference position of the movable body, that is, the rest position of the movable body changes due to pressing force (loads) generated with respect to the movable body when the pressure of the pump unit increases. If the movable body starts the reciprocating rotation from a position shifted from the reference position, the movable body may move within a movement range differing from the movement range when the movable body starts the reciprocating rotation from the reference position. In the pump unit of the conventional pump, this movement may shift the displacement position of the movable wall caused by the pressing portion and set as a distance from the reference position. Due to this shift of the displacement position of the movable wall, the air in the sealed chamber 82 cannot be sufficiently compressed and the desired discharge pressure and the desired flow rate for the air cannot be ensured. In this case, it is necessary to increase the distance, that is, the amplitude of the reciprocating rotational movement of the movable body. This requires to ensure a clearance for the increased movement in the case, and thereby it becomes impossible to downsize the pump.

On the other hand, according to the present embodiment, since the pressing force (loads) respectively applied to the pressing portions 35 by the air remaining in the sealed chambers 82 of the pump units 80a, 80b cancels each other, it is possible to suitably locate the movable body 30 at the reference position to vibrate the movable body 30 from the reference position. Therefore, it is possible to realize the pump 1 which can provide a higher pressure and can be downsized.

Figures 12A, 12B:
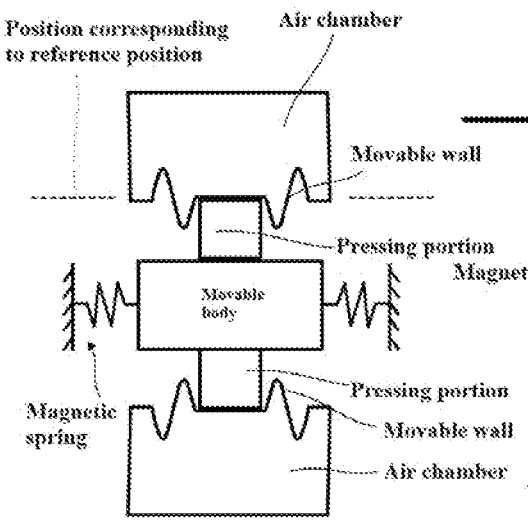
FIG. 12B is a schematic diagram which is referred to explain operation of the pump unit in the pump according to the first embodiment of the present invention.
Figures 13A, 13B:
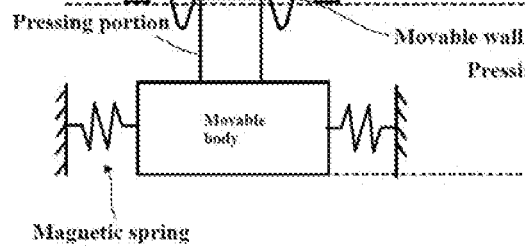
FIG. 13B is a schematic diagram which is referred to explain the operation of the pump unit if the number of pump units is one.

Each of FIG. 12A and FIG. 12B is a schematic diagram which is referred to explain operation of the pump unit in the pump according to the first embodiment of the present invention. Each of FIG. 13A and FIG. 13B is a schematic diagram which is referred to explain the operation of the pump unit if the number of pump units is one.

In the present embodiment, the sealed chambers 82 (which respectively correspond to the "air chambers" in FIGS. 12A-12B and FIGS. 13A-13B) in the pump units 80 (80a, 80b) are disposed so as to face each other in the direction perpendicular to the extending direction of the movable body 30 and sandwich the movable body 30 in the reciprocating rotational movement direction of the movable body 30, that is, from both sides of the vibration direction of the arm portions 324a, 324b located at the reference position.

In the present embodiment, the four sealed chambers 82 are disposed to sandwich the shaft portion 40 and sandwich the arm portions 324a, 324b of the movable body 30 in the depth direction. Namely, in the present embodiment, the movable body 30 has the arm portions 324a, 324b which are respectively provided so as to extend toward the direction perpendicular to the axial direction of the shaft portion 40 from a position where the movable body 30 is axially supported by the shaft portion 40 so as to be freely reciprocated and rotated. The other one of the coil core portions 62a, 62b and the magnets 70a, 70b are respectively provided at the tip end portions (the magnet fixing portions 326a, 326b) of the arm portions 324a, 324b.

The sealed chambers 82 are provided in pairs sandwiching the arm portions 324a, 324b of the movable body 30. The pair of sealed chambers 82 (shown as the "air chambers" in FIGS. 12A-12B) are disposed so as to face each other at positions for sandwiching the arm portions 324a, 324b in the reciprocating rotation direction of the arm portions 324a, 324b (the depth direction of the case 21).

Each of the pressing portions 35 has the pair of pushers 351, 351 respectively corresponding to the pair of movable walls 822. The movable walls 822 of the pair of the sealed chambers 82, 82 are respectively pressed by the corresponding pushers 351 when the arm portions 324a, 324b perform the reciprocating rotation.

As shown in FIG. 12A, the pressing portions 35 of the movable body 30 are respectively connected to the movable walls 822 defining the pair of the sealed chambers 82 (the "air chambers") located on both sides of the reciprocating rotation direction of the reciprocating rotational movement of the movable body 30 in the present embodiment.

In the configuration in which the movable body 30 is elastically supported by the magnetic springs as described above, the movable walls 822 are displaced by loads generated when pressure in the sealed chambers 82 increases to press the movable body 30 through the pressing portions 35.

At this time, since the pressing force (loads) applied to the movable body 30 from the pressing portions 35 of the pair of sealed chambers 82 cancel each other in the present embodiment as shown in FIG. 12B, the movable body 30 is stably held at the reference position.

On the other hand, it is assumed that the sealed chamber 82 (the "air chamber") is disposed on only one side of the reciprocating rotation direction of the movable body 30 as shown in FIGS. 13A-13B. In this case, when the movable wall 822 of the one sealed chamber 82 is displaced toward the movable body 30, the movable body 30 is pressed through the pressing portion 35 to offset the rest position of the movable body 30 from the reference position. In this configuration, it is required to more increase the amplitude of the vibration of the movable body 30 or more increase a movable range of the movable body 30 because of the increase of the pressure in the sealed chamber 82 unlike the present embodiment.

On the other hand, since the movable range of the movable body 30 can be reduced in the present embodiment, it is possible to downsize the pump 1.

In addition, the movable body 30 has the pair of arm portions 324a, 324b which are axially supported by the shaft portion 40 at the center portion of the case 21 so as to be freely reciprocated and rotated and which oppositely extend from the center portion of the case 21 in the direction perpendicular to the axial direction of the shaft portion 40 in the present embodiment.

The other one (the magnets 70a, 70b in the present embodiment) of the coil core portions 62a, 62b and the magnets 70a, 70b is respectively provided on the tip end portions of the arm portions 324a, 324b, that is, the magnet fixing portions 326a, 326b.

On the other hand, the one (the coil core portions 62a, 62b in the present embodiment) of the coil core portions 62a, 62b and the magnets 70a, 70b is respectively provided on the fixed body 20 so as to face the other one (the magnets 70a, 70b in the present embodiment) of the coil core portions 62a, 62b and the magnets 70a, 70b.

Each of the pump units 80 (80a, 80b) contains the pair of sealed chambers 82. The pair of sealed chambers 82 of each pump unit 80 (80a, 80b) are disposed so as to be in parallel with each other along the extending direction of the pair of arm portions 324a, 324b. Further, each of the pressing portions 35 has the pair of pushers 351 respectively corresponding to the pair of movable walls 822 of the sealed chamber 82 of the pump unit 80a and the movable wall 822 of the sealed chamber 82 of the pump unit 80b. Each of the movable walls 822 of the sealed chambers 82 is pressed by the pressing portion 35 when the arm portions 324a, 324b performs the reciprocating rotation.

As described above, each of the pump units 80 (80a, 80b) of the present embodiment contains the plurality of sealed chambers 82 aligned in the longitudinal direction thereof. Further, the discharge flow paths and the discharge ports of the sealed chambers 82 are connected in parallel. As a result, when the movable body 30, that is, the arm portions 324a, 324b perform the reciprocating rotation around the shaft portion 40, the pushers 351 of the pressing portions 35 alternately press the movable walls 822 of the sealed chambers 82 disposed in parallel in the longitudinal direction. With this configuration, it is possible to provide the pump 1 with the high flow rate.

In addition, since the pump 1 of the present embodiment has the configuration in which the magnets 70a, 70b required to operate the magnetic springs are provided on one of the movable body 30 and the fixed body 20, it is possible to reduce the number of parts of the pump 1 as compared with the configuration in which the magnets 70a, 70b are provided on both of the movable body 30 and the fixed body 20.

As described above, since it is possible to reduce the number of parts of the pump 1, it is possible to further reduce a cost of the pump 1 and reduce the number of assembly steps for the pump 1.

Further, the movable body 30 is elastically supported by the magnetic springs of the magnetic circuits provided by the magnets 70a, 70b and the core portions 60a, 60b and the movable walls 822 are displaced by the reciprocating rotation of the movable body 30 caused by the resonance to drive the pump units 80 (80a, 80b). Thus, it is possible to further reduce the thickness of the pump 1 as well as increase an output of the pump 1, thereby ensuring the desired pressure and the desired flow rate.

Further, in the present embodiment, the coil core portion 62a corresponding to the magnet 70a located on the one side of the movable body 30 constitutes the magnetic circuit with one coil. Thus, it is possible to reduce the cost of the pump 1.

Second Embodiment

Figure 14:
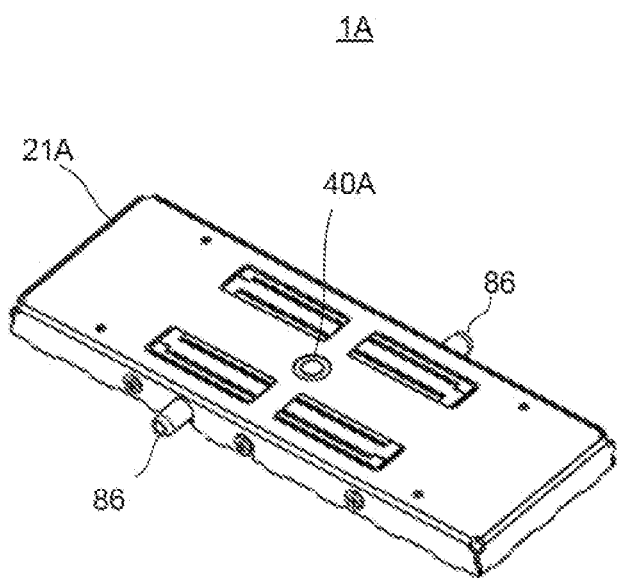
FIG. 14 is an external perspective view of a pump according to a second embodiment of the present invention.
Figure 15:
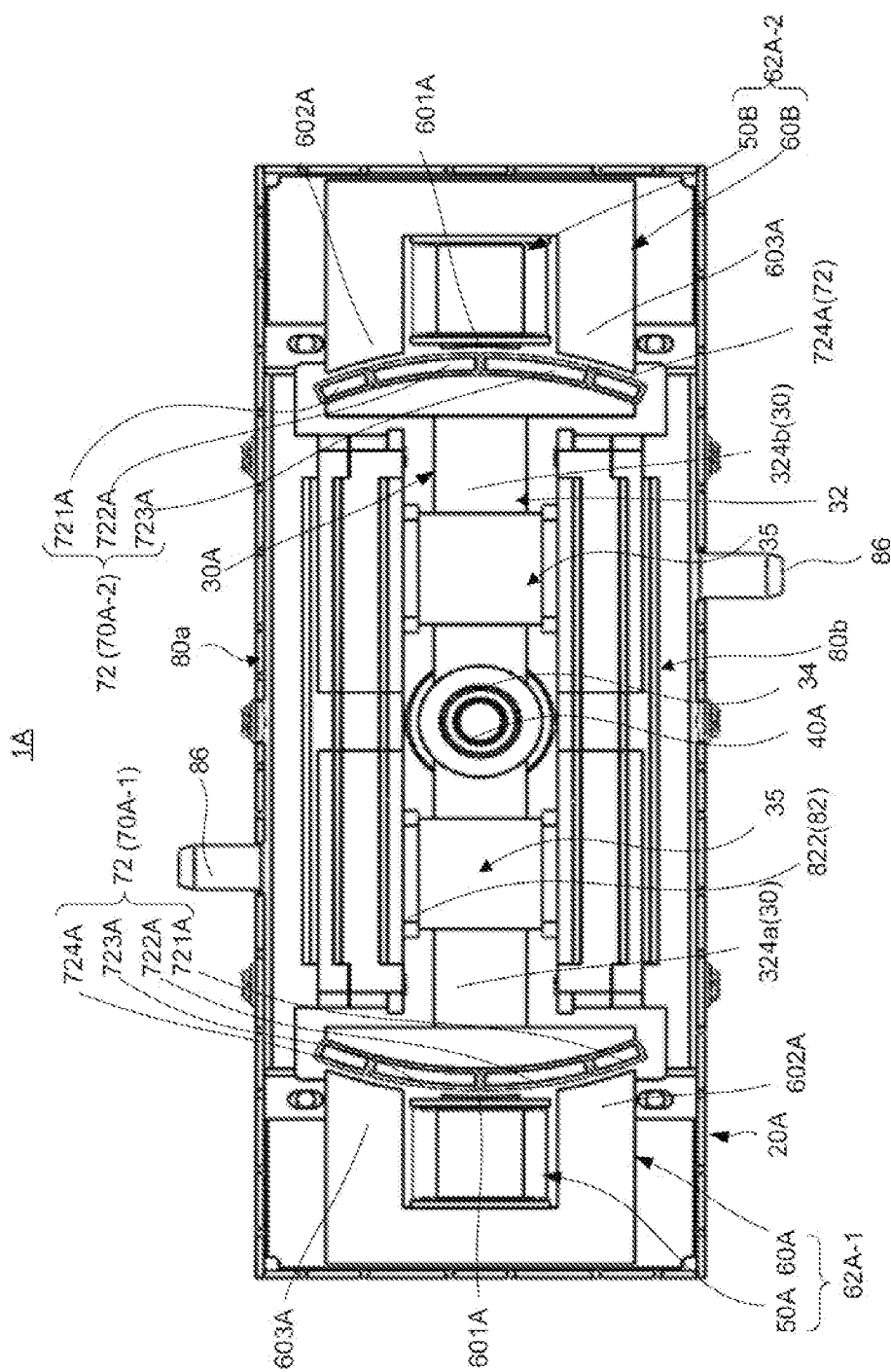
FIG. 15 is a planar view showing a main part configuration of the pump according to the second embodiment of the present invention.
Figure 16:
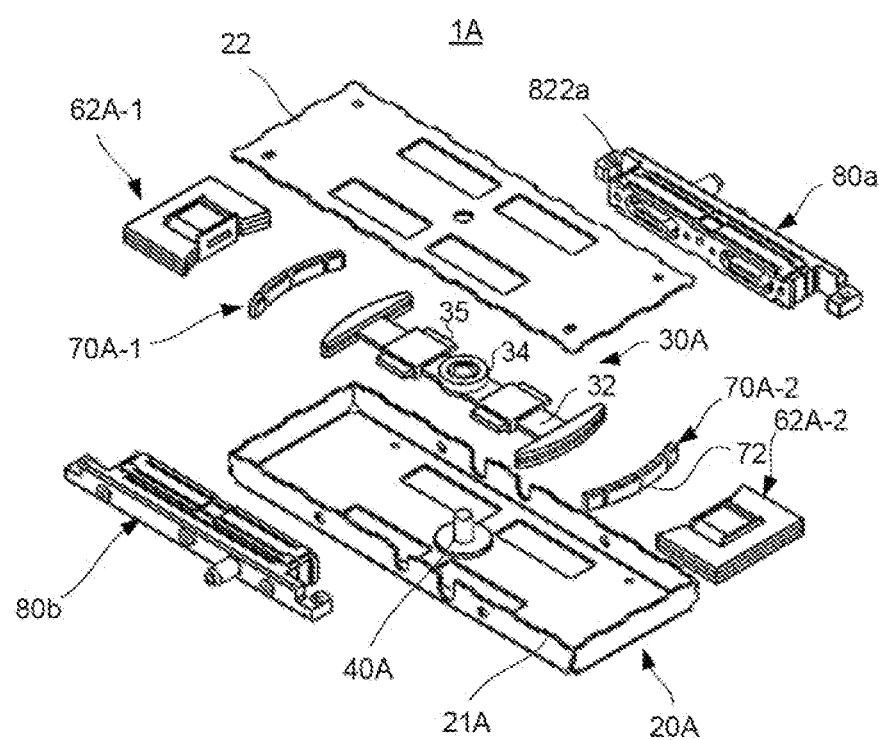
FIG. 16 is an exploded perspective view of the pump according to the second embodiment of the present invention.
Figure 17:
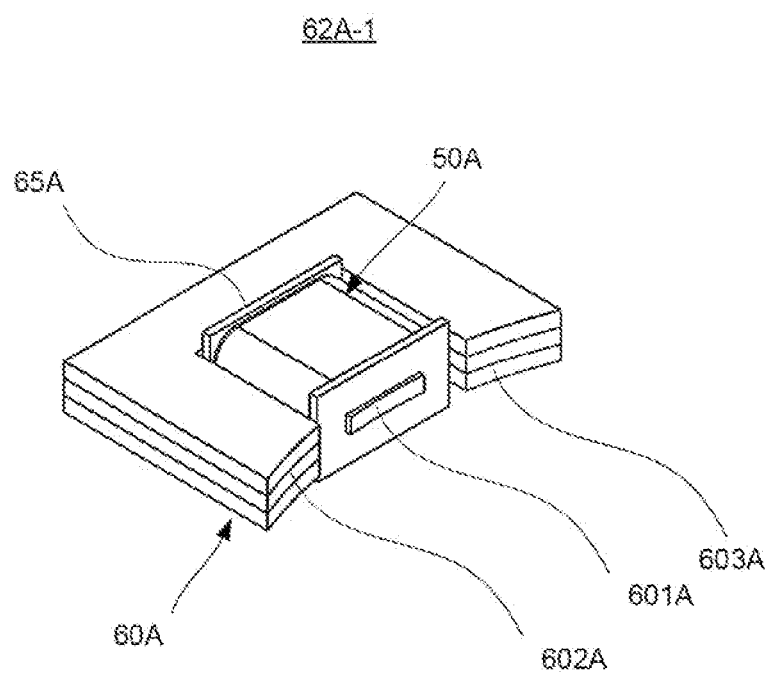
FIG. 17 is a perspective view of a coil core portion in the pump according to the second embodiment of the present invention.
Figure 18:
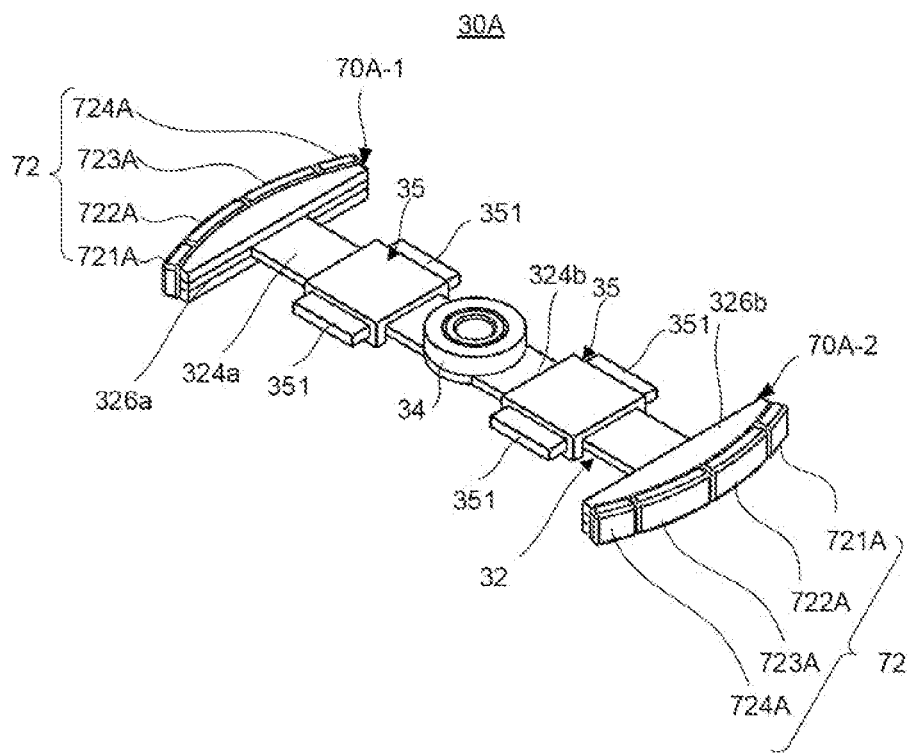
FIG. 18 is a perspective view of a movable body in the pump according to the second embodiment of the present invention.
Figure 19:
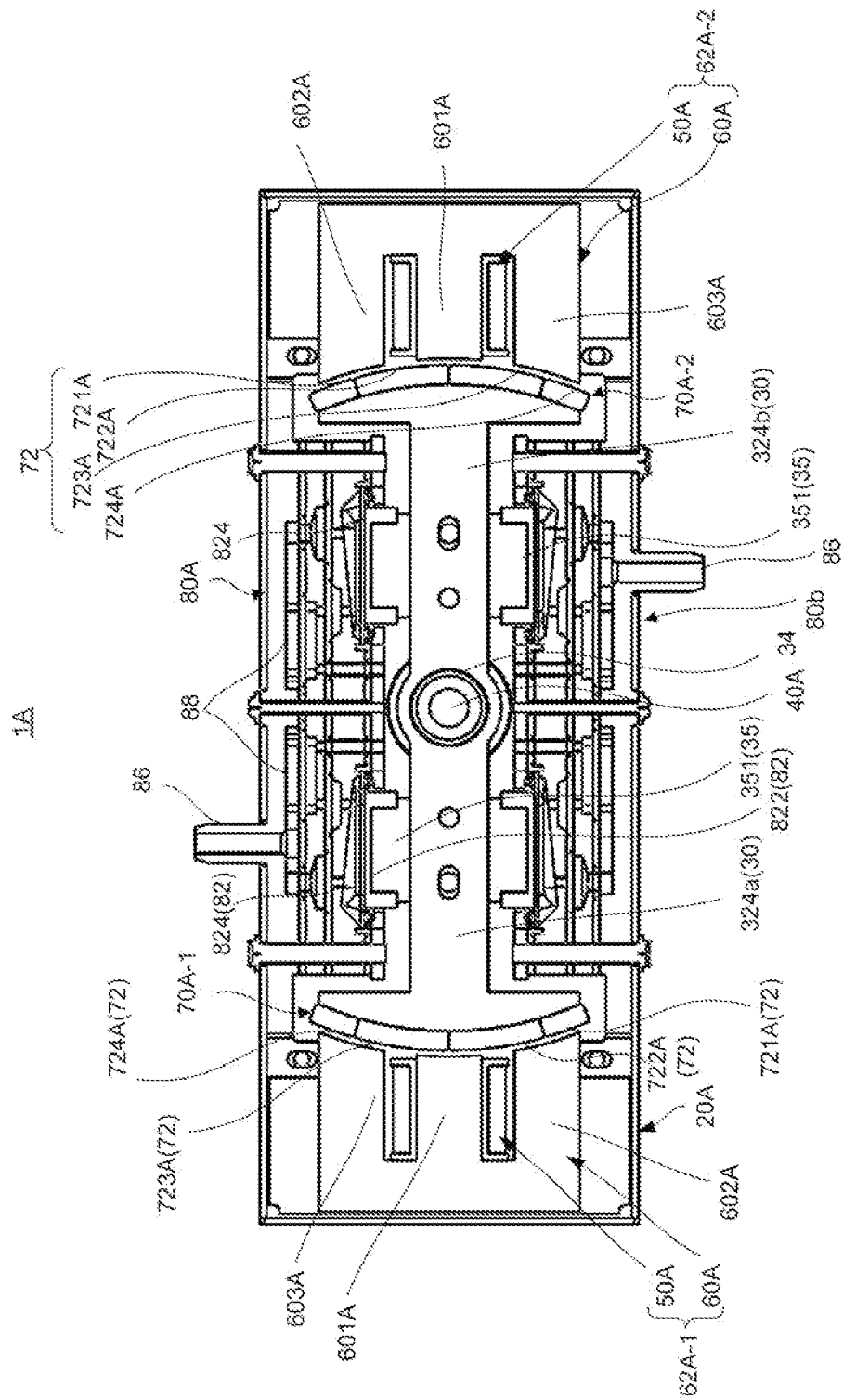
FIG. 19 is a horizontal cross-sectional view showing an internal configuration of the pump according to the second embodiment of the present invention.

FIG. 14 is an external perspective view of a pump according to a second embodiment of the present invention. FIG. 15 is a planar view the pump according to the second embodiment of the present invention in a state that a cover of the pump is omitted for the explanation. FIG. 16 is an exploded perspective view of the pump according to the second embodiment of the present invention. FIG. 17 is a perspective view of a coil core portion in the pump according to the second embodiment of the present invention. FIG. 18 is a perspective view of a movable body in the pump according to the second embodiment of the present invention. FIG. 19 is a horizontal cross-sectional view showing an internal configuration of the pump according to the second embodiment of the present invention.

Entire Configuration of Pump 1A

A pump 1A has the same basic configuration as the basic configuration of the pump 1 corresponding to the first embodiment shown in FIG. 1 except that the configuration of the magnetic circuit is modified. Thus, the same components are denoted by the same reference numbers and description for the same components will be omitted in the following description.

As shown in FIGS. 14 to 16, the pump 1A of the present embodiment has the same basic configuration as the basic configuration of the pump 1 of the first embodiment except the number of poles of a magnet 70A and the number of poles of a coil core portion 62A are different from corresponding ones of the pump 1.

The pump 1A is configured so that a movable body 30A is provided in a case 21A of a fixed body 20A which has a rectangular planar shape so as to freely perform reciprocating rotation around a shaft portion 40A disposed at a center of the case 21A. Four-pole magnets 70A-1, 70A-2 are respectively provided at both ends of the movable body 30A which are disposed so as to be separated from each other in a longitudinal direction of the movable body 30A perpendicular to an axial direction of the shaft portion 40A.

On the other hand, coil core portions 62A-1, 62A-2 each having three core magnetic poles are provided in the case 21 and at positions respectively facing the magnets 70A-1, 70A-2 through an air gap and aligned along wall portions separated from each other in a longitudinal direction of the case 21A.

The pump units 80a, 80b are provided along the extending direction of the movable body 30A in the case 21A so as to sandwich the movable body 30A in the depth direction of the case 21A. The movable walls 822 of the pump units 80a, 80b are respectively connected to the pressing portions 35 of the movable body 30A which is configured in the same manner as the pressing portions 35 of the pump 1.

Since the coil core portion 62A-1 and the coil core portion 62A-2 have the same configuration, only the configuration of the coil core portion 62A-1 will be described and the description for the coil core portion 62A-2 will be omitted.

As shown in FIG. 17, the coil core portion 62A-1 has a coil 50A and the core portion 60A having an E-shape. The coil 50A is wound around a center protrusion of the core portion 60A through a bobbin 65A. The center protrusion of the core portion 60A serves as a core magnetic pole 601A. When the electrical current flows in the coil 50A, a tip end portion of the center protrusion of the core portion 60A serves as the core magnetic pole 601A and core magnetic poles 602A, 603A connected to a base end portion of the core magnetic pole 601A are magnetized with a magnetic pole different from a magnetic pole of the core magnetic pole 601A. A peripheral surface of the tip end portion of the core magnetic pole 601A is covered by a flange of the bobbin 65A so that the core magnetic pole 601A partially protrudes from the bobbin 65A.

The core magnetic poles 601A, 602A, 603A of the coil core portion 62A-1 are disposed in an arc track so as to face the magnet 70A-1. The coil core portion 62A-2 which is configured similarly to the coil core portion 62A-1 is disposed with being separated from the coil core portion 62A-1 in the longitudinal direction of the case 21 so that core magnetic poles 601A, 602A, 603A of the coil core portion 62A-2 face the magnet 70A-2.

As shown in FIG. 18, the magnets 70A-1, 70A-2 are respectively fixed to the magnet fixing portions 326a, 326b on both end portions of the movable body main portion 32 in which the bearing portion 34 is provided at the center portion of the movable body main portion 32.

Magnetic pole surfaces 72 of each of the magnets 70A-1, 70A-2 are disposed so as to have an outwardly protruding arc track and be separated from each other in the longitudinal direction perpendicular to the axis of the shaft portion 40A. The core magnetic poles 601A to 603A of the core portions 60A of the core portions 62A-1, 62A-2 respectively face the magnetic pole surfaces 72 of the magnets 70A-1, 70A-2.

Each of the magnetic pole surfaces 72 of the magnets 70A-1, 70A-2 has different magnetic poles 721A to 724A arranged in the rotation direction so that different magnetic poles are alternately arranged.

Magnetic attraction force is generated between the magnet 70A-1 and the core portion 60A of the coil core portion 62A-1 and between the magnet 70A-2 and the core portion 60A of the coil core portion 62A-2 and thus the magnetic attraction force serves as a magnetic spring. Namely, in each of both end portions of the movable body 30A separated from each other in the longitudinal direction, the magnetic spring due to the magnetic attraction force is generated.

With the above-described magnet springs due to the magnetic attraction force, the rotation of the movable body 30A around the shaft portion 40A is suppressed when the pump 1A is in a non-energized state, that is in a normal state. More specifically, the core portions 60A-1, 60A-2 and the magnets 70A-1, 70A-2 attract each other due to the magnetic attraction force at a position where the center core magnetic poles 601A of the core portions 60A-1, 60A-2 respectively face center portions of the two center magnetic poles 722A, 723A of the magnets 70A-1, 70A-2 attached to the movable body 30A.

The magnetic attraction force is generated between the core portion 60A-1 and the magnet 70A-1 and between the core portion 60A-2 and the magnet 70A-2. Since the two kinds of the magnetic attraction force generated in the longitudinal direction of the movable body 30 are generated on the same straight line in opposite directions through the shaft portion 40A, the two kinds of the magnetic attraction force are canceled each other.

As shown in FIG. 19, in the pump 1A, boundary surface positions (switching positions) between adjacent poles among the magnetic poles 721A, 722A, 723A, 724A of each of the magnet 70A-1, 70A-2 respectively coincide with center positions of the core magnetic poles 601A to 603A of the coil core portion 62A in the arc track of the rotation direction. In the normal state, a position of the movable body 30A for setting the above-described positional relationship is a rotation reference position. More specifically, the boundary surface position (switching positions) between the magnetic pole 721A, 722A faces the center position of the core magnetic pole 602A in the arc track of the rotation direction of the movable body 30. Similarly, the boundary surface position (switching positions) between the magnetic pole 722A, 723A faces the center position of the core magnetic pole 601A in the arc track of the rotation direction of the movable body 30. Further, the boundary surface position (switching positions) between the magnetic pole 723A, 724A faces the center position of the core magnetic pole 603A in the arc track of the rotation direction of the movable body 30.

Figure 20:
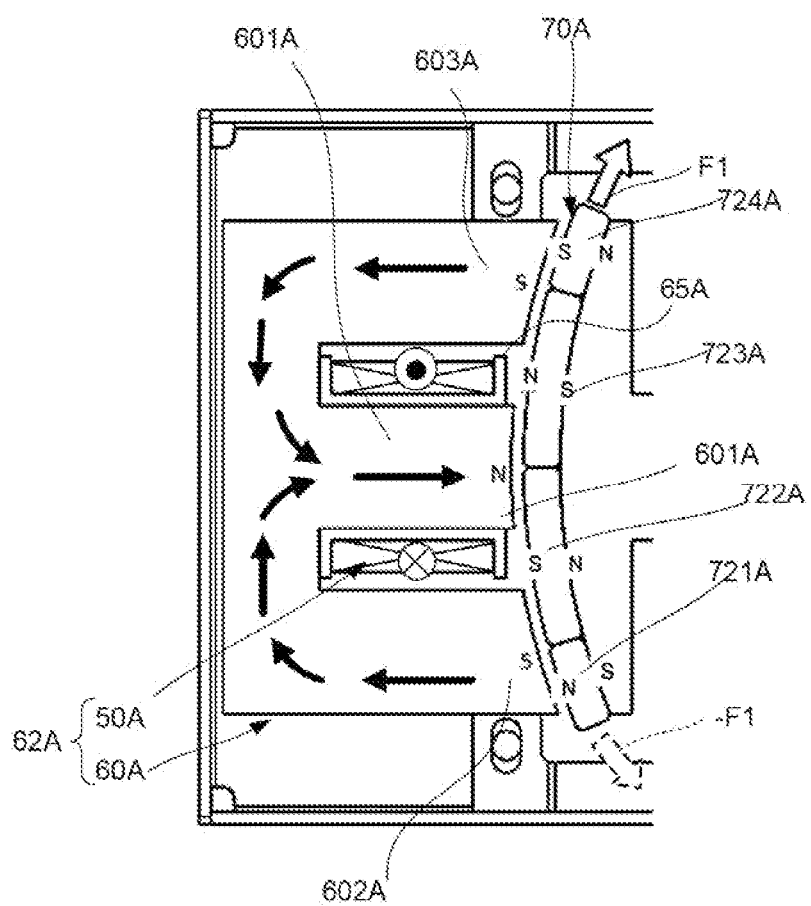
FIG. 20 is a view showing a configuration of a magnetic circuit of the pump according to the second embodiment of the present invention.

FIG. 20 is a view showing a magnetic circuit configuration of the pump according to the second embodiment of the present invention. In this regard, only the magnetic circuit provided by the coil core portion 62A-1 and the magnet 70A-1 will be described with reference to FIG. 20 and description for the magnetic circuit provided by the coil core portion 62A-2 and the magnet 70A-2 will be omitted.

Magnet 70A

It is assumed that the magnet 70A-1 has four magnetic poles on the magnetic pole surface 72 facing the core portion 62A-1 and these four magnetic poles are aligned in the rotation direction so that different polarities are alternately arranged.

In the magnet 70A-1 (sometimes referred by "70A") shown in FIG. 20, the center two magnetic poles 722A, 723A are respectively the S pole and the N pole and the magnetic poles 721A, 724A sandwiching the center magnetic poles 722A, 723A are respectively the N pole and the S pole. Further, the magnetic poles 721A, 722A, 723A, 724A face the core magnetic poles 601A, 602A, 603A of the core magnetic pole 601A of the coil core portion 62A-1 (sometimes referred by "62A").

The electrical current is supplied to the coil 50A of the coil core portion 62A to excite the core portion 60A so that the core magnetic pole 601A which is the center protrusion of the core portion 60A is magnetized with the N pole and the core magnetic poles 602A, 603A of the core portion 60A is magnetized with the S pole.

As shown in FIG. 20, the magnetic poles 722A, 723A of the magnet 70A facing the core magnetic pole 601A are respectively the S pole and the N pole. The magnetic pole 722A which is the S pole attracts the core magnetic pole 601A which is the N pole due to the magnetic attraction force and repels the core magnetic pole 723A which is the N pole.

Further, since the magnetic pole 721A of the magnet 70A is the N pole, the magnetic attraction force is generated between the magnetic pole 721A and the core magnetic pole 602A which is the S pole. The magnetic pole 724A of the magnet 70A which is the S pole repels the core magnetic pole 603A which is the S pole.

Due to these actions, thrust force in the direction F1 is generated between the magnet 70A and the coil core portion 62A and thus the movable body 30A is driven in the direction F1.

In the state that the electrical current is not supplied in the coil 50A, the movable body 30A is located at the rotation reference position, that is a neutral position of the reciprocation movement by the magnetic attraction force of the magnetic springs.

In addition, the electrical current is supplied to the coil 50A in the opposite direction to reverse the polarity of the core portion 60A. Namely, the center core magnetic pole 601A of the core portion 60A facing the magnet 70A is magnetized with the S pole and the core magnetic poles 602A, 603A of the core portion 60A are magnetized with the N pole. As a result, the magnet 70A facing the core portion 60A rotates in a direction opposite to the direction F1 (the direction −F1) and thus the movable body 30A is driven in the direction −F1 which is directly opposite to the direction F1.

In the movable body 30A, since the relationship between the magnet 70A-2 disposed on the opposite side of the magnet 70A-1 through the shaft portion 40A and the coil core portion 62A-2 is a point-symmetrical configuration around the shaft portion 40A with respect to the relationship between the magnet 70A-1 and the coil core portion 62A-1. Thus, the thrust force in the direction F1 or the direction −F1 is also generated between the magnet 70A-2 and the coil core portion 62A-2 by the magnet 70A-2 and the coil core portion 62A-2.

Thus, the movable body 30A suitably performs the reciprocating rotation around the shaft portion 40A due to the magnetic attraction force and the repelling force effectively generated in the magnetic circuits at both end portion of the movable body 30.

The driving principle and the pump performance of the pump 1A are the same as those of the pump 1 of the first embodiment indicated by the above equations (1), (2), (3), (4) and (5).

Similar to the first embodiment, when the direction of the electrical current supplied to the coil 50A is changed in the vibration actuator 10 of the pump 1A, the movable body 30A including the magnets 70A-1, 70A-2 can perform the reciprocating movement (reciprocating vibration) in the vibration direction.

According to the above-described configuration, the movable body 30 is elastically supported by the magnetic spring of the magnetic circuit provided by the magnets 70A-1 and the core portion 60A-1 and the magnetic spring of the magnetic circuit provided by the magnet 70A-2 and the core portion 60A-2. Further, the movable walls 822 are displaced by the reciprocating rotation of the movable body 30 caused by the resonance to drive the pump units 80a, 80b to suction the air into the sealed chambers 82 of the pump units 80a, 80b and discharge the air from the sealed chambers 82 of the pump units 80a, 80b. In this regard, the pump units 80a, 80b of the present embodiment have the same configuration as the pump units 80a, 80b of the first embodiment. Thus, it is possible to further reduce the thickness of the pump 1A as well as increase the output of the pump 1A, thereby ensuring the desired pressure and the desired flow rate of the pump 1A.

Further, in the magnetic circuits disposed at both end portions of the pump 1A, the core portion 60A of each magnetic circuit constitutes the three magnetic poles 601A, 602A, 603A with one coil 50A. A cost of this can be reduced, and thereby a cost of the pump 1A can be reduced. Further, since the core portion 60A has the three magnetic poles, the drive output can be increased more than the configuration in which the core portion 60A has two magnetic poles.

Third Embodiment

Figure 21:
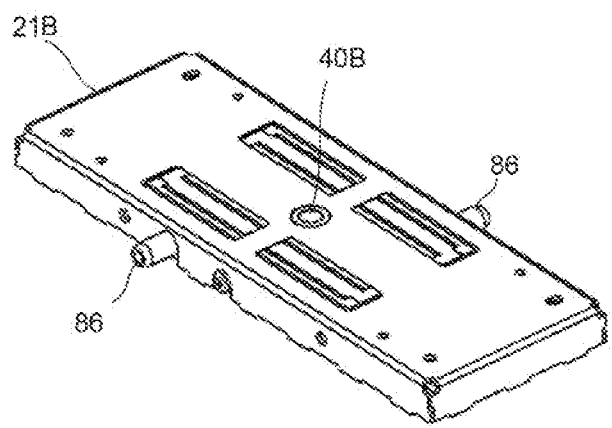
FIG. 21 is an external perspective view of a pump according to a third embodiment of the present invention.
Figure 22:
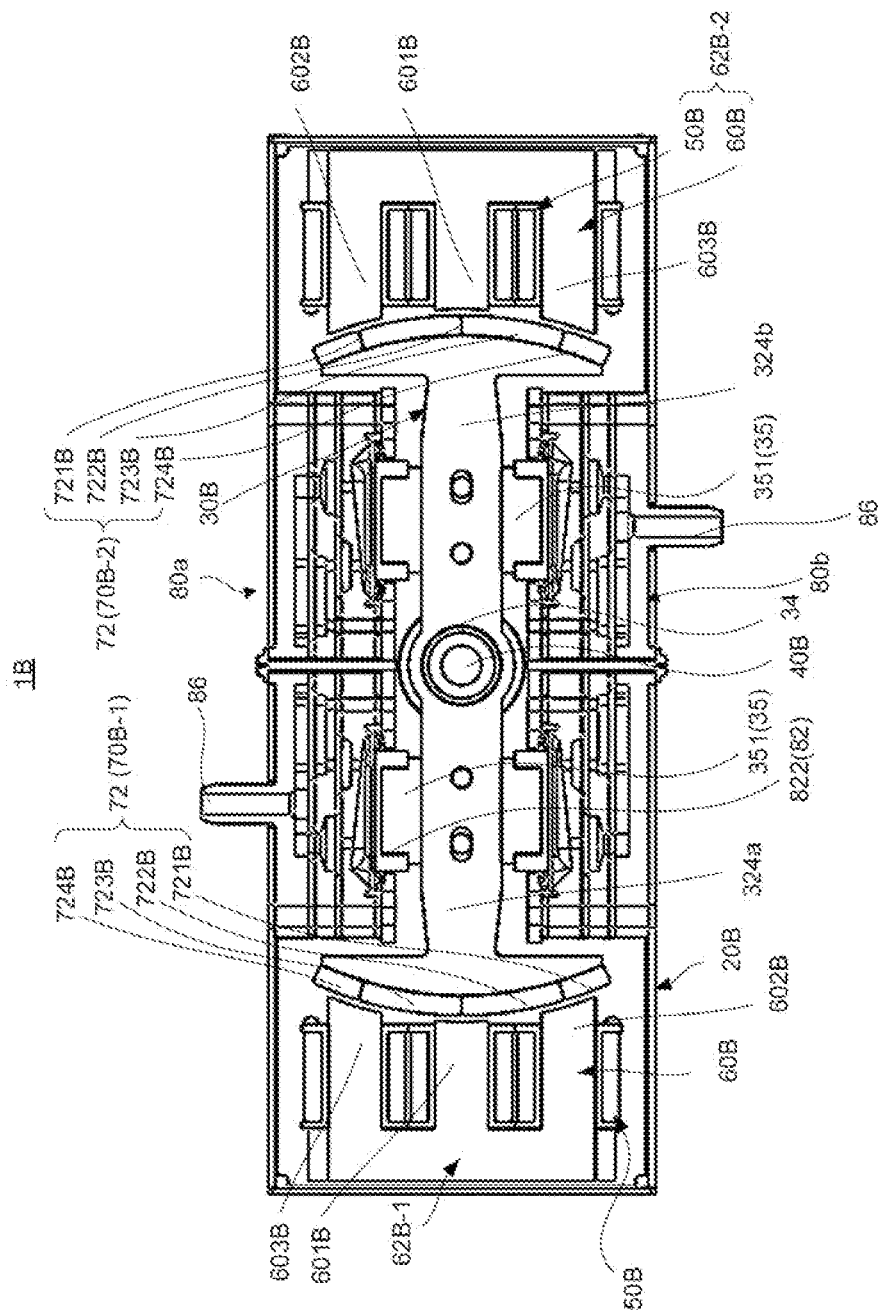
FIG. 22 is a horizontal cross-sectional view showing an internal configuration of the pump according to the third embodiment of the present invention.
Figure 23:
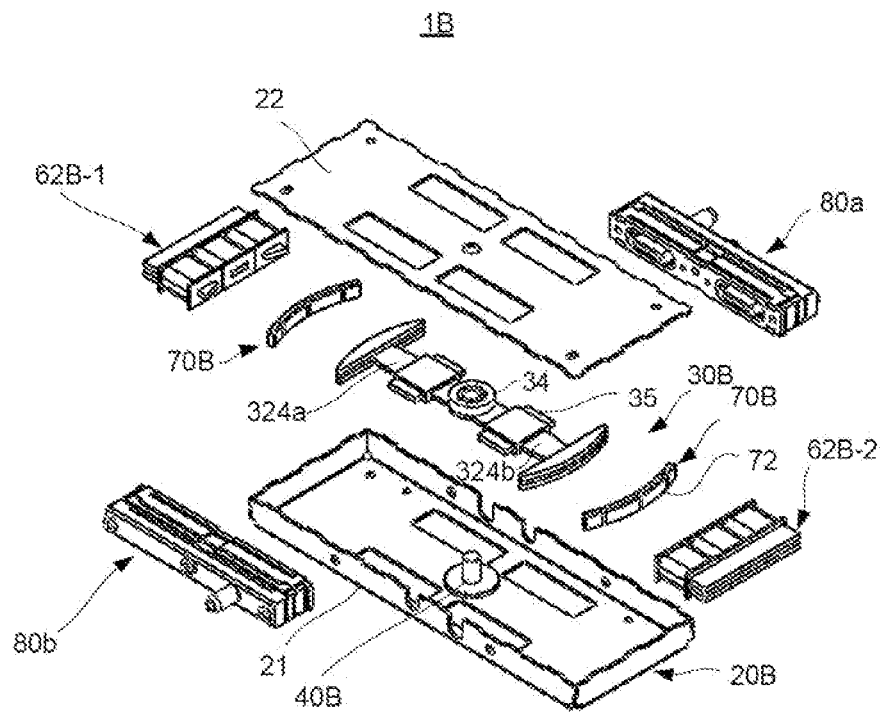
FIG. 23 is an exploded perspective view of the pump according to the third embodiment of the present invention.
Figure 24:
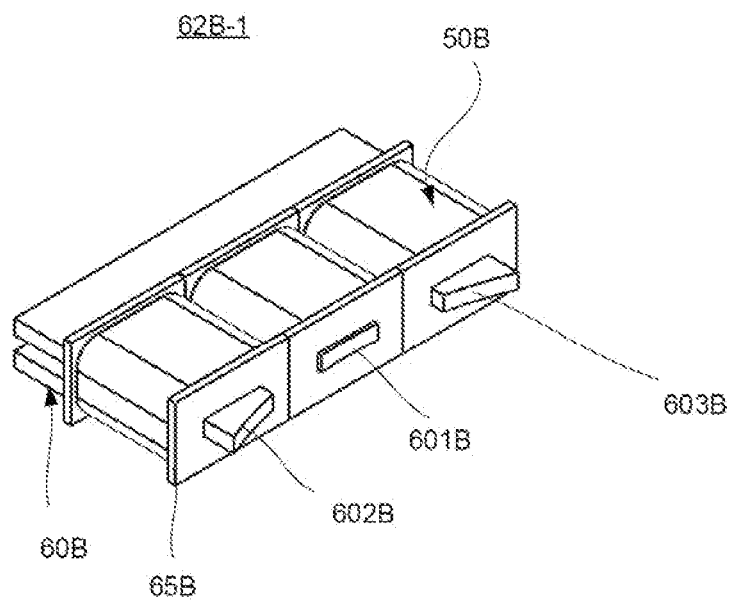
FIG. 24 is a perspective view of a coil core portion in the pump according to the third embodiment of the present invention.
Figure 25:
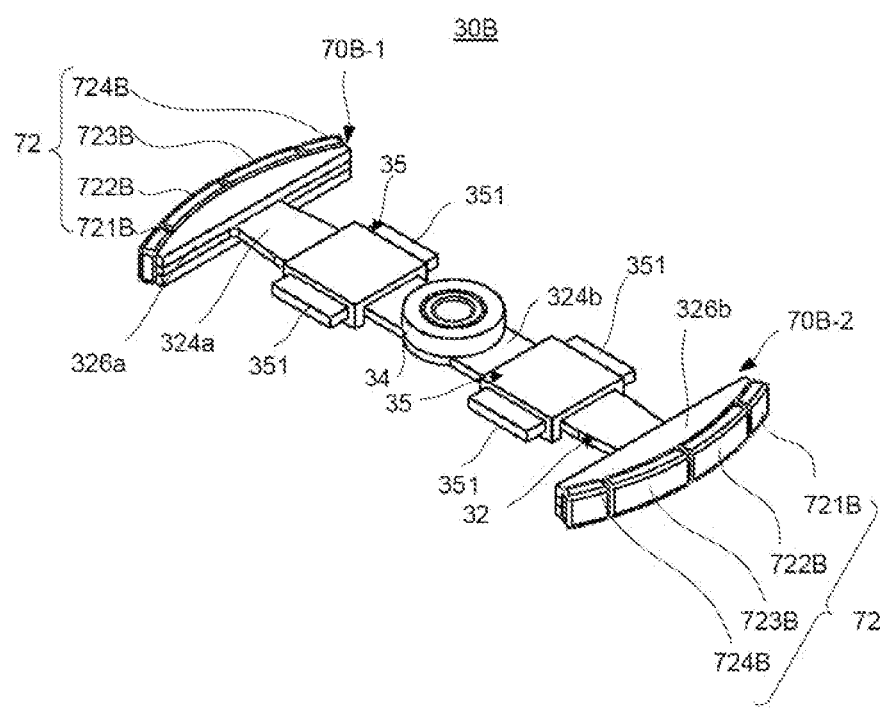
FIG. 25 is a perspective view of a movable body in the pump according to the third embodiment of the present invention.
Figure 26:
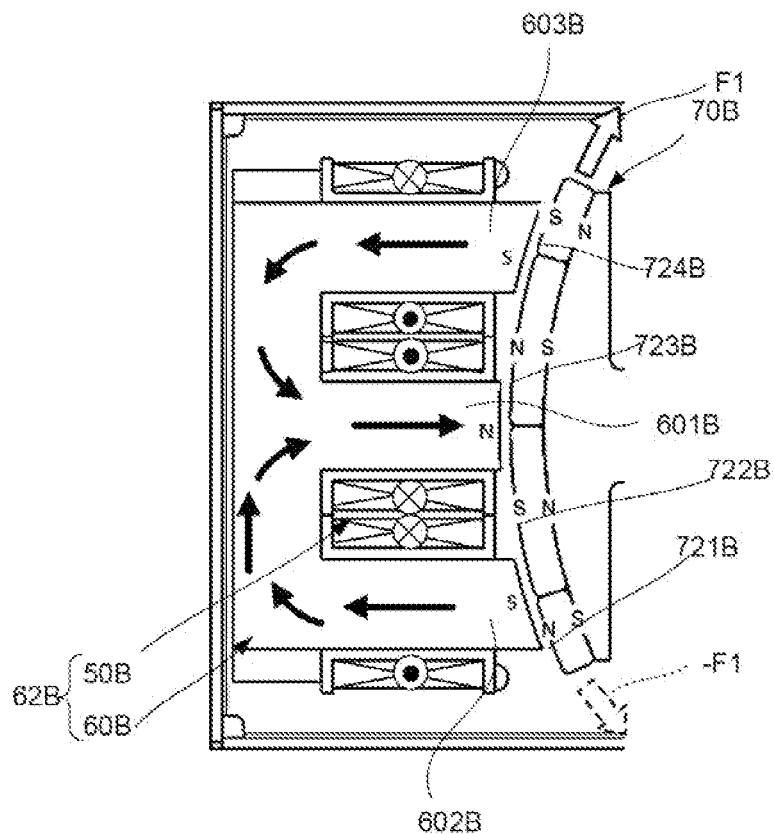
FIG. 26 is a view showing a configuration of a magnetic circuit of the pump according to the third embodiment of the present invention.

FIG. 21 is an external perspective view of a pump according to a third embodiment of the present invention. FIG. 22 is a horizontal cross-sectional view showing an internal configuration of the pump according to the third embodiment of the present invention. FIG. 23 is an exploded perspective view of the pump according to the third embodiment of the present invention. FIG. 24 is a perspective view of a coil core portion in the pump according to the third embodiment of the present invention. FIG. 25 is a perspective view of a movable body in the pump according to the third embodiment of the present invention. FIG. 26 is a view showing a magnetic circuit configuration of the pump according to the third embodiment of the present invention.

A pump 1B of the present embodiment has the same configuration as the configuration of the pump 1 of the first embodiment shown in FIG. 1 except that only the configuration of the magnetic circuit is modified. Thus, the same components are denoted by the same reference numbers and description for the same components will be omitted in the following description.

As shown in FIGS. 21 to 26, the pump 1B has the same basic configuration as the basic configuration of the pump 1 of the first embodiment except the number of poles of a magnet 70B and the number of poles of a coil core portion 62B are different from corresponding ones of the pump 1.

The pump 1B is configured so that a movable body 30B is provided in a case 21B of a fixed body 20B which has a rectangular planar shape so as to freely perform reciprocating rotation around a shaft portion 40B disposed at a center of the case 21B. Four-pole magnets 70B-1, 70B-2 are respectively provided at both end portions of the movable body 30B which are disposed so as to be perpendicular to an axial direction of the shaft portion 40B and are separated from each other in a longitudinal direction of the movable body 30B.

On the other hand, coil core portions 62B-1, 62B-2 each having three core magnetic poles are provided in the case 21B and at positions respectively facing the magnets 70B-1, 70B-2 through an air gap. The magnets 70B-1, 70B-2 are respectively disposed along wall portions of the case 21B separated from each other in the longitudinal direction of the case 21B.

The pump units 80a, 80b are provided in the case 21 along an extending direction of the movable body 30B so as to sandwich the movable body 30B in a depth direction of the case 21B. The movable walls 822 of the pump units 80a, 80b are respectively connected to pressing portions 35 of the movable body 30B which is configured in the same manner as the pressing portions 35 of the pump 1 or the pump 1A.
Coil Core Portion 62B Since the coil core portion 62B-1 and the coil core portion 62B-2 have the same configuration, only the configuration of the coil core portion 62B-1 (sometimes referred to as "62B") will be described and description for the coil core portion 62B-2 will be omitted.

As shown in FIG. 24, the coil core portion 62B-1 has three coils 50B and a core portion 60B having an E-shape. The coil core portion 62B-1 is configured to have the same number of coils 50B as the number of core magnetic poles of the core portion 60B.

Namely, the coils 50B are respectively wound around outer circumferences of three protrusions of the E-shaped core portion 60B through bobbins 65B. The three protrusions of the core portion 60B serve as core magnetic poles.

When the electrical current flows in the coils 50B of the coil core portion 62B, tip end portions of the three protrusions of the core portion 60B respectively serve as core magnetic poles 601B to 603B and the magnetic poles 601B to 603B are magnetized so as to have alternately different polarities aligned in the rotation direction of the movable body 30B. In this regard, peripheral surfaces of the tip end portions of the three protrusions of the core portion 60B serving as the core magnetic poles 601B to 603B are respectively covered by flanges of the bobbins 65B.

The core magnetic poles 601B, 602B, 603B of the coil core portion 62B-1 are disposed in an arc track so as to face the magnet 70B-1.

The coil core portion 62B-2 which is configured similarly to the coil core portion 62B-1 is disposed so as to be point-symmetrical around the shaft portion 40B with respect to the coil core portion 62B-1 with being separated from the coil core portion 62B-1 in the longitudinal direction of the case 21B. Further, the coil core portion 62B-2 is disposed so that the core magnetic poles 601B, 602B, 603B of the coil core portion 62B-2 face the magnet 70B-2.
Magnet 70B As shown in FIG. 25, the magnets 70B-1, 70B-2 are respectively fixed to the magnet fixing portions 326a, 326b on both end portions of the movable body main portion 32 in which the bearing portion 34 is provided at the center portion of the movable body main portion 32.

Magnetic pole surfaces 72 of the magnets 70B-1, 70B-2 are disposed so as to form an arc track outwardly protruding and are separated from each other in the longitudinal direction perpendicular to an axis of the shaft portion 40B. The core magnetic poles 601B to 603B of the core portions 60B of the coil core portions 62B-1, 62B-2 respectively face the magnets 70B-1, 70B-2. Each of the magnetic pole surfaces 72 of the magnets 70B-1, 70B-2 has magnetic poles 721B to 724B arranged in the rotation direction so that different polarities are alternately arranged.

Magnetic attraction force is generated between the magnet 70B-1 and the core portion 60B of the coil core portion 62B-1 and between the magnet 70B-2 and the core portion 60B of the coil core portion 62B-2 and thus the magnetic attraction force functions as a magnetic spring. Namely, the magnetic spring due to the magnetic attraction force is generated at each of the end portions of the movable body 30B separated from each other in the longitudinal direction.

Due to the magnetic spring due to the above-described magnetic attraction force, the rotation of the movable body 30B around the shaft portion 40B is suppressed when the pump 1B is in the non-energized state, that is, in the normal state. More specifically, the core portions 60B-1, 60B-2 and the magnets 70B-1, 70B-2 attract each other due the magnetic attraction force at a position where the center core magnetic poles 601B of the core portions 60B of the coil core portions 602B-1, 62B-2 respectively face center portions of the two center magnetic poles 722B, 723B of the magnets 70B-1, 70B-2.

The magnetic attraction force is generated between the core portion 60B-1 and the magnet 70B-1 and between the core portion 60B-2 and the magnet 70B-2. Since the two kinds of the magnetic attraction force generated in the longitudinal direction of the movable body 30B are generated on the same straight line in opposite directions with sandwiching the shaft portion 40B, the two kinds of the magnetic attraction force cancel each other.

As shown in FIG. 22, in the pump 1B, boundary surface positions (switching positions) between adjacent poles among the magnetic poles 721B, 722B, 723B, 724B of each of the magnet 70B-1, 70B-2 respectively coincide with center positions of the core magnetic poles 601B to 603B of the coil core portion 62B in the arc track of the rotation direction. In the normal state, a position of the movable body 30B for setting the above-described positional relationship is a rotation reference position. More specifically, the boundary surface position (switching positions) between the magnetic pole 721B, 722B faces the center position of the core magnetic pole 602B in the arc track of the rotation direction of the movable body 30B. Similarly, the boundary surface position (switching positions) between the magnetic pole 722B, 723B faces the center position of the core magnetic pole 601B in the arc track of the rotation direction of the movable body 30B. Further, the boundary surface position (switching positions) between the magnetic pole 723B, 724B faces the center position of the core magnetic pole 603B in the arc track of the rotation direction of the movable body 30B.

FIG. 26 is a view showing a magnetic circuit configuration of the pump according to the third embodiment of the present invention. In this regard, only the magnetic circuit provided by the coil core portion 62B-1 and the magnet 70B-1 will be described with reference to FIG. 26 and description for the magnetic circuit provided by the coil core portion 62B-2 and the magnet 70B-2 will be omitted.

It is assumed that the magnet 70B-1 has four magnetic poles on the magnetic pole surface 72 facing the coil core portion 62B-1 and the four magnetic poles are aligned in the rotation direction so that different polarities are alternately arranged.

In the magnet 70B-1 (sometimes referred by "70B") shown in FIG. 26, the center two magnetic poles 722B, 723B are respectively the S pole and the N pole and the magnetic poles 721B, 724B sandwiching the center magnetic poles 722B, 723B are respectively the N pole and the S pole. Further, the magnetic poles 721B, 722B, 723B, 724B of the magnet 70B-1 face the magnetic poles 601B, 602B, 603B of the coil core portion 62B-1 (sometimes referred by "62B").

The electrical current is supplied to each of the coils 50B of the coil core portion 62B to excite the core portion 60B. In the core portion 60B, winding directions of the coils 50B, flow directions of the electrical current in the coils 50B or the like are set so that the polarity of the core magnetic pole 601B which is the center protrusion of the core portion 60B is different from the polarities of the core magnetic poles 602B, 603B adjacent to the core magnetic pole 601B on the both sides. For example, in the coil core portion 62B shown in FIG. 26, the core magnetic pole 601B which is the center protrusion of the core portion 60B is magnetized with the N pole and the core magnetic poles 602B, 603B of the core portion 60B are magnetized with the S pole. At this time, since the core magnetic poles 601B, 602B, 603B are excited by the corresponding coils 50B, it is possible to ensure a high driving output.

As shown in FIG. 26, the magnetic poles 722B, 723B of the magnet 70B facing the core magnetic pole 601B which is the N pole are respectively the S pole and the N pole. The magnetic pole 722B which is the S pole attracts the core magnetic pole 601B which is the N pole due to the magnetic attraction force and repels the magnetic pole 723B which is the N pole. Further, since the magnetic pole 721B of the magnet 70B is the N pole, the magnetic attraction force is generated between the magnetic pole 721B and the core magnetic pole 602B which is the S pole. The magnetic pole 724B of the magnet 70B which is the S pole repels the core magnetic pole 603B which is the S pole.

Due to these actions, thrust force in the direction F1 is generated between the magnet 70B and the coil core portion 62B and thus the movable body 30B is driven in the direction F1. When the electrical current is not supplied in the coils 50B, the movable body 30B is located at the rotation reference position, that is a neutral position of the reciprocation movement by the magnetic attraction force of the magnetic springs.

In addition, the electrical current is supplied to the coils 50B in the opposite direction to reverse the polarity of the core portion 60B, that is, the center core magnetic pole 601B of the core portion 60B facing the magnet 70B is magnetized with the S pole and the magnetic poles 602B, 603B are magnetized with the N pole. As a result, the magnet 70B facing the core portion 60B rotates in a direction opposite to the direction F1 (the direction −F1) and thus the movable body 30B is driven in the direction −F1 which is directly opposite to the direction F1.

In the movable body 30B, the relationship between the magnet 70B-2 and the coil core portion 62B-2 is point-symmetrical around the shaft portion 40B with respect to the relationship between the magnet 70B-1 and the coil core portion 62B-1. Thus, the relationship between the magnet 70B-2 and the coil core portion 62B-2 is the same as the relationship between the magnet 70B-1 and the coil core portion 62B-1. Therefore, it is possible to cause thrust force in the direction F1 or the direction −F1 between the magnet 70B-2 and the coil core portion 62B-2 as with the case of the thrust force between the magnet 70B-1 and the coil core portion 62B-1. As a result, the movable body 30B suitably performs the reciprocating rotation around the shaft portion 40B due to the magnetic attraction force and the repelling force effectively generated in the magnetic circuits at both end portions of the movable body 30B.

The movable body 30B of the pump 1B including the magnets 70B-1, 70B-2 can perform the reciprocating movement (reciprocating vibration) in the vibration direction by changing the flow direction of the electrical current supplied in the coils 50B as described above similarly to the first embodiment. In this regard, the driving principle and the pump performance of the pump 1B are the same as those of the pump 1 of the first embodiment indicated by the above equations (1), (2), (3), (4) and (5).

Further, the movable body 30B is elastically supported by the magnetic spring of the magnetic circuit provided by the magnet 70B-1 and the core portion 60B-1 and the magnetic spring of the magnetic circuit provided by the magnet 70B-2 and the core portion 60B-2. Further, the movable walls 822 are displaced by the reciprocating rotation of the movable body 30B caused by the resonance to drive the pump unit 80. Thus, it is possible to further reduce the thickness of the pump 1B as well as increase the output of the pump 1B, thereby ensuring the desired pressure and the desired flow rate of the pump 1B.

Further, since the coil core portions 62B in the magnetic circuit of one side of the pump 1B has the three coils 50B, it is possible to disperse arrangement spaces for the coils 50B than a case where the number of coils 50B is one. As a result, it is possible to increase design flexibility of the coils and thus it is possible to increase the driving output of the pump 1B and reduce the thickness of the pump 1B.

Fourth Embodiment

Figure 27:
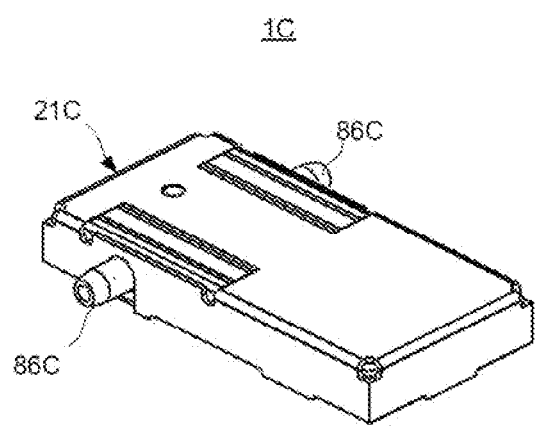
FIG. 27 is an external perspective view of a pump according to a fourth embodiment of the present invention.
Figure 28:
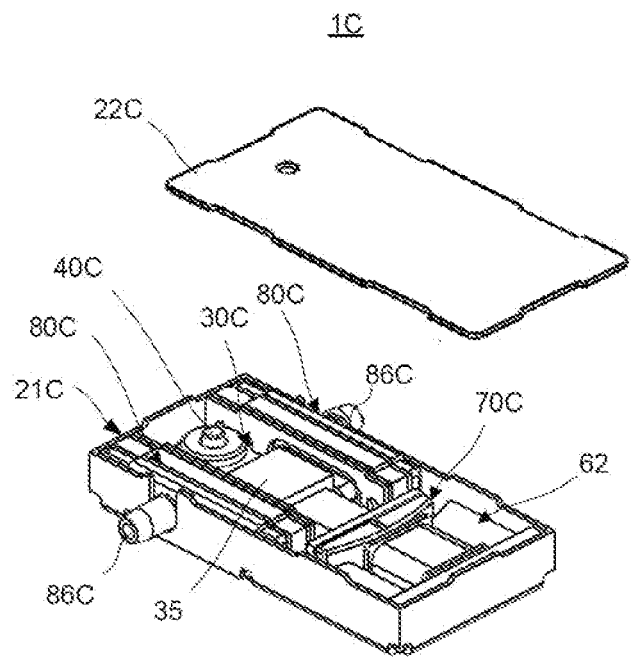
FIG. 28 is a perspective view showing an internal configuration of the pump according to the fourth embodiment of the present invention.
Figure 29:
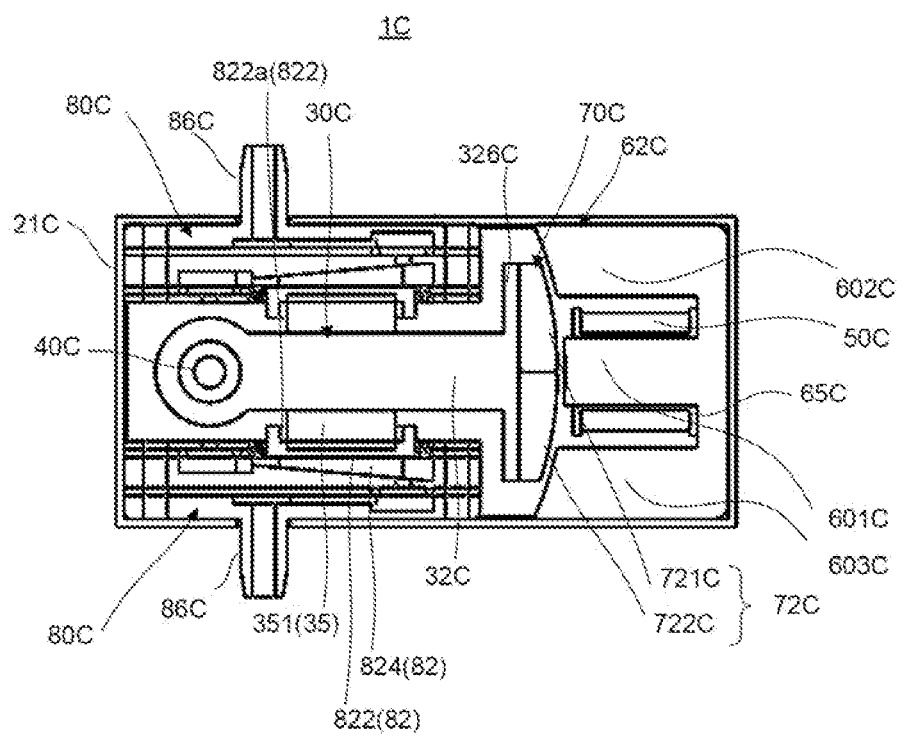
FIG. 29 is a horizontal cross-sectional view showing the internal configuration of the pump according to the fourth embodiment of the present invention.
Figure 30:
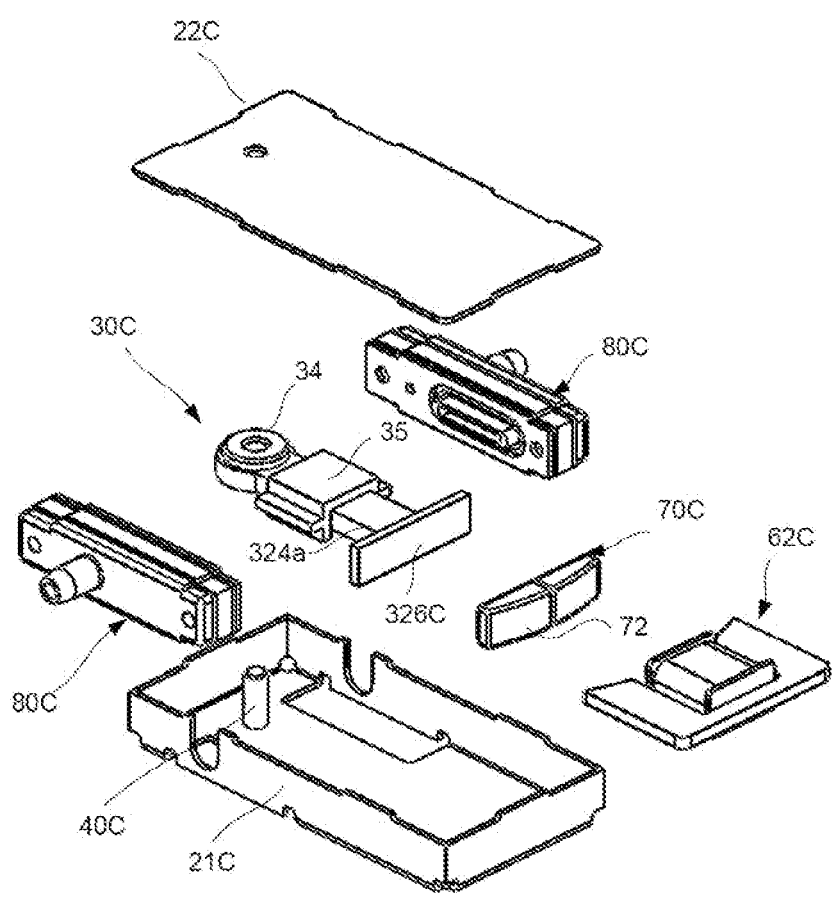
FIG. 30 is an exploded perspective view of the pump according to the fourth embodiment of the present invention.
Figure 31:
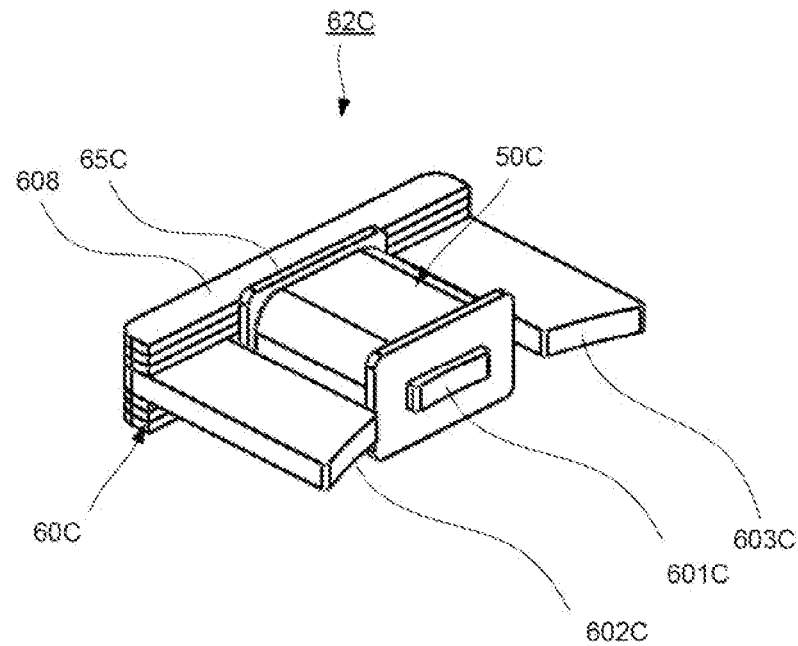
FIG. 31 is a perspective view of a coil core portion in the pump according to the fourth embodiment of the present invention.
Figure 32:
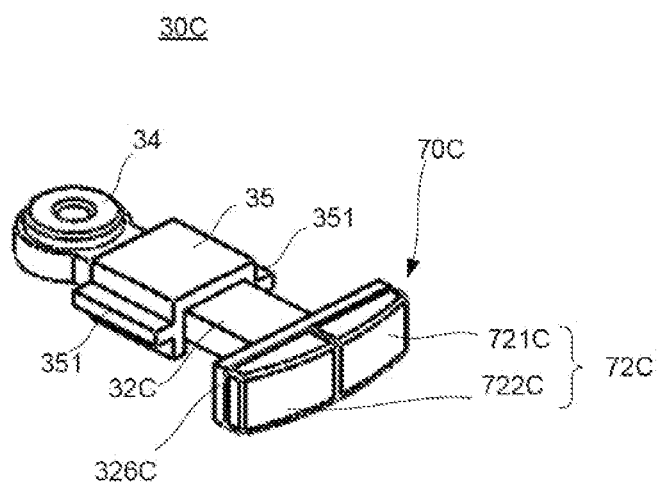
FIG. 32 is a perspective view of a movable body in the pump according to the fourth embodiment of the present invention.

FIG. 27 is an external perspective view of a pump according to a fourth embodiment of the present invention. FIG. 28 is a perspective view showing an internal configuration of the pump according to the fourth embodiment of the present invention. FIG. 29 is a horizontal cross-sectional view showing the internal configuration of the pump according to the fourth embodiment of the present invention. FIG. 30 is an exploded perspective view of the pump according to the fourth embodiment of the present invention. FIG. 31 is a perspective view of a coil core portion in the pump according to the fourth embodiment of the present invention. FIG. 32 is a perspective view of a movable body in the pump according to the fourth embodiment of the present invention.

A pump 1C has the same basic configuration as the configuration of the pump 1 of the first embodiment shown in FIG. 1 except that only the configuration of the magnetic circuit is modified. Thus, the same components are denoted by the same reference numbers and description for the same components will be omitted in the following description.

The pump 1C shown in FIGS. 27 to 32 has the same basic configuration as the basic configuration of the pump 1 of the first embodiment except that the number of magnetic circuits constituted of a magnet 70C and a coil core portion 62C is one and the number of poles of the magnet 70C and the number of poles of the coil core portion 62C are different from corresponding ones of the pump 1.

Entire Configuration of Pump 1C

As shown in FIG. 27 and FIG. 28, the pump 1C is configured so that a movable body 30C is provided in a case 21C having a rectangular planar shape so as to freely perform reciprocating rotation (reciprocating pivotal movement) around a shaft portion 40C disposed at a center of the case 21C. The case 21C constitutes a housing together with a cover 22C for closing an opening of the case 21C.

The shaft portion 40C is provided in the case 21C so as to be located on one of both end portions of the case 21C in a longitudinal direction of the case 21C. The movable body 30C is provided in the case 21C so as to extend a direction perpendicular to an axial direction of the shaft portion 40C and freely perform the pivotal movement around the shaft portion 40C. The bearing portion 34 through which the shaft portion 40C is passed is provided on one end portion of the movable body 30C. The magnet 70C having two poles is provided on the other end portion of the movable body 30C.

On the other hand, the coil core portion 62C is provided in the case 21C along a wall portion of the case 21C located on one side of the longitudinal direction of the case 21C. The coil core portion 62C is disposed at a position facing the magnet 70C through an air gap and has three core magnetic poles 601C, 602C, 603C.

In addition, a pair of pump units 80C having the same basic configuration as the configurations of the pump units 80a, 80b are provided in the case 21C along the extending direction of the movable body 30C. The pair of pump units 80C are provided so as to sandwich the movable body 30C in a depth direction of the case 21C. The movable walls 822 of the pump units 80C are respectively connected to pushers 351 of pressing portions 35 of the movable body 30C which have the same configurations as the configurations of the pusher 351 of the pressing portion 35 of the pump 1, the pump 1A or the pump 1B and displaced by the reciprocating rotation (pivotal movement) of the movable body 30C. The air can be discharged from discharge portions 86C by this displacement of the movable walls 822.

Coil Core Portion 62C

As shown in FIG. 31, the coil core portion 62C has a coil 50C and a core portion 60C having an E-shape. The core portion 60C has core magnetic poles 601C to 603C parallelly provided so as to protrude toward one direction from a rear surface portion 608 having a predetermined height, that is a height substantially equal to heights of the case 21C and the movable body 30C. In the present embodiment, each of the core magnetic poles 601C to 603C has a thickness (a length in the height direction) thinner than a thickness of the rear surface portion 608 and protrudes from a center portion in the height direction of the rear surface portion 608 toward the same direction. With this configuration, each of tip end surfaces of the core magnetic poles 601C to 603C is formed to be long in the rotation direction of the movable body 30C and to be in an arc-shape which concaves on the tip side. In the coil core portion 62C, one coil 50C is wound around the core magnetic pole 601C which is a center protrusion of the core portion 60C through a bobbin 65C.

Namely, in the coil core portion 62C, the electrical current is supplied in the coil 50C to magnetize a tip end portion of the core magnetic pole 601C located in the coil 50C. At this time, a polarity of the core magnetic pole 601C is different from polarities of the core magnetic poles 602C, 603C sandwiching the core magnetic pole 601C from both sides. As a result, the core magnetic poles 601C to 603C which are the protrusions of the core portion 60C are magnetized so as to have alternately different polarities arranged in the rotation direction of the movable body 30C. A peripheral surface of the tip end portion of the core magnetic pole 601C is covered with a flange of the bobbin 65C.

The core magnetic poles 601C, 602C, 603C of the coil core portion 62C are arranged in an arc track so as to face the magnet 70C.

Magnet 70C

As shown in FIG. 32, the bearing portion 34 is provided on one end portion of the movable body main portion 32C. The magnet 70C is fixed to a magnet fixing portion 326C formed on the other end portion of the movable body main portion 32C for passing the shaft portion 40C.

The magnetic pole surface 72C of the magnet 70C is provided on the other end portion of the movable body main portion 32C so as to have an arc shape protruding toward the outside and faces the core magnetic poles 601C to 603C of the core portion 60C. The magnetic pole surface 72C of the magnet 70C has different magnetic poles 721C, 722C arranged in the rotation direction of the movable body 30C.

The magnet 70C is disposed at a position so that a boundary surface position (switching position) between the magnetic poles 721C, 722C of the magnet 70C is located on an axis line of an extending direction (longitudinal direction) of the magnet 70C and the boundary surface position (switching position) between the magnetic poles 721C, 722C of the magnet 70C overlaps with a center of the center core magnetic pole 601C of the coil core portion 62 in the rotation direction.

Magnetic attraction force is generated between the magnet 70C and the core portion 60C of the coil core portion 62C and thus the magnetic attraction force serves as a magnetic spring. Namely, the magnetic spring due to the magnetic attraction force is generated at the other end portion of the movable body 30C in the longitudinal direction thereof.

Due to the magnetic spring provided by the magnet 70C and the core portion 60C of the coil core portion 62C, the rotation of the movable body 30C around the shaft portion 40C is suppressed when the pump 1C is in the non-energized state, that is, in the normal state. More specifically, the core portion 60C and the magnet 70C attract each other due to the magnetic attraction force at a position where center portions of the two center magnetic poles 721C, 722C of the magnet 70C face the center core magnetic pole 601C of the core portions 60C.

Since the magnet 70C and the core portions 60C attract each other due to the magnetic attraction force, the movable body 30C is held in a horizontal state at a reference position which is a center position of an oscillation range of the reciprocating rotation (pivotal movement) of the movable body 30C, i.e., at the center (rotation reference position) of the vibration range of the oscillation movement around the shaft portion 40C.

As shown in FIG. 29, the magnet 70C and the coil core portion 62C are provided in the case 21C so that the boundary surface position (switching position) between the magnetic poles 721C, 722C of the magnet 70C overlaps the center of the rotational direction of the center core magnetic pole 601C of the coil core portion 62C in the longitudinal direction. This position of the movable body 30C for achieving the above-described positional relationship is the rotation reference position in the normal condition of the movable body 30C. The movable body 30C can perform the reciprocating rotation (reciprocating pivotal movement) from this position in opposite directions of the depth direction of the case 21, that is in directions perpendicular to both of the longitudinal direction and the axial direction of the case 21C by the same distance.

Figure 33:
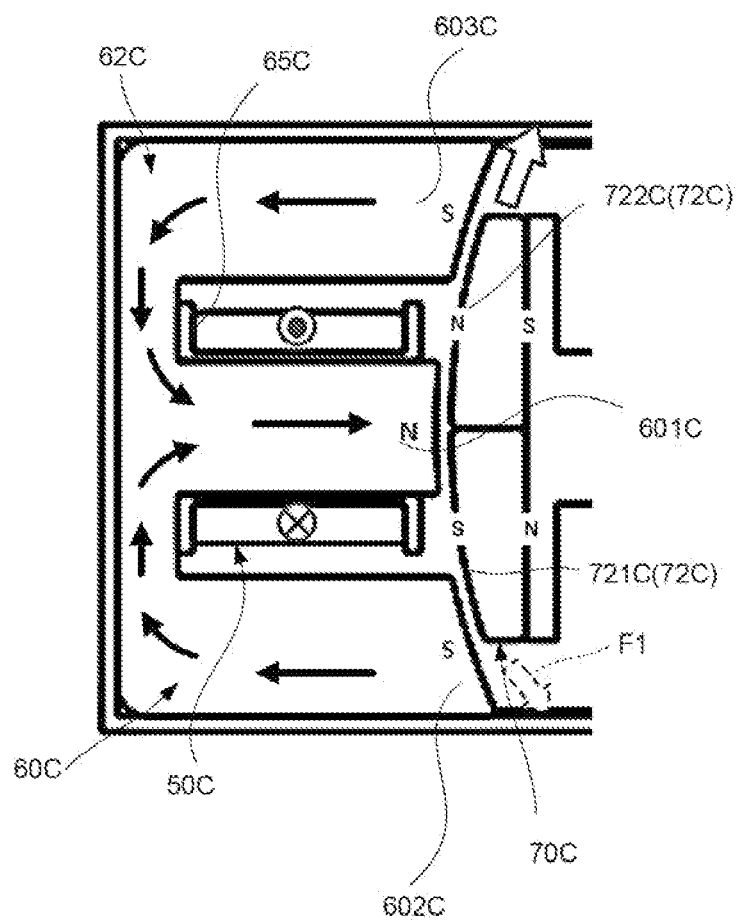
FIG. 33 is a view showing a configuration of a magnetic circuit of the pump according to the fourth embodiment of the present invention.

FIG. 33 is a view showing a magnetic circuit configuration of the pump according to the fourth embodiment of the present invention.

The magnet 70C has two different polarities alternately arranged in the rotation direction on a magnetic pole surface 72C facing the coil core portion 62C. In the magnet 70C shown in FIG. 33, the two magnetic poles 721C, 722C are respectively the S pole and the N pole and face the magnetic poles of the coil core portion 62C.

The electrical current is supplied to the coil 50C of the coil core portion 62C to excite the core portion 60C. At this time, a winding direction of the coil 50C, a flow direction of the electrical current supplied in the coil 50C or the like are set so that the polarity of the core magnetic pole 601C which is the center protrusion of the core portion 60C is different from the polarities of the core magnetic poles 602C, 603C adjacent to the core magnetic pole 601C on the both sides.

For example, in the coil core portion 62C shown in FIG. 33, the center core magnetic pole 601C of the core portion 60C is magnetized with the N pole and the core magnetic poles 602C, 603C of the core portion 60C are magnetized with the S pole. At this time, the core magnetic pole 601C is magnetized by the coil 50C.

As shown in FIG. 33, the magnetic poles 721C, 722C of the magnet 70C facing the core magnetic pole 601C which is the N pole are respectively the S pole and the N pole. The magnetic pole 721C which is the S pole attracts the core magnetic pole 601C which is the N pole due to the magnetic attraction force and the magnetic pole 722C which is the N pole repels the core magnetic pole 601C which is the N pole.

Due to these actions, thrust force in the direction F1 is generated between the magnet 70C and the coil core portion 62C and thus the movable body 30C is driven in the direction F1.

When the electrical current is not supplied in the coil 50C, the movable body 30C is located at the rotation reference position, that is a neutral position of the reciprocating movement by the magnetic spring provided by the magnet 70C and the coil core portion 62C.

In addition, the electrical current is supplied to the coil 50C in the opposite direction to reverse the polarity of the core portion 60C, that is, the center core magnetic pole 601C of the core portion 60C facing the magnet 70C is magnetized with the S pole and the core magnetic poles 602C, 603C are magnetized with the N pole. As a result, the magnet 70C facing these core magnetic poles 601C, 602C, 603C rotates in a direction opposite to the direction F1 (the direction −F1) and thus the movable body 30C is driven in the direction −F1 which is directly opposite to the direction F1.

Thus, the movable body 30C suitably perform the reciprocating rotation (pivotal movement) around the shaft portion 40C due to the magnetic attraction force and the repelling force effectively generated in the magnetic circuit provided by the magnet 70C and the coil core portion 62C at the other end portion of the movable body 30C.

As described above, by changing the direction of the electrical current supplied to the coil 50C in the pump 1C, the movable body 30C including the magnet 70C can perform the reciprocating movement (reciprocating vibration) in the vibration direction similarly to the first embodiment. In this regard, the driving principle and the pump performance of the pump 1C are the same as those of the pump 1 of the first embodiment indicated by the above equations (1), (2), (3), (4) and (5).

In the magnetic circuit of the pump 1C, the core portion 60C uses the coil 50C to provide the three core magnetic poles 601C, 602C, 603C. As described above, the pump 1C has a configuration in which the magnetic spring of the magnetic circuit provided by the magnet 70C and the core portion 60C elastically support the movable body 30C which can perform the reciprocating rotation (pivotal movement) due to the resonance. Thus, it is possible to further downsize the pump 1C and reduce the cost of manufacturing the pump 1C by reducing the number of parts, and thereby increasing the drive output of the pump 1C.

Fifth Embodiment

Figure 34:
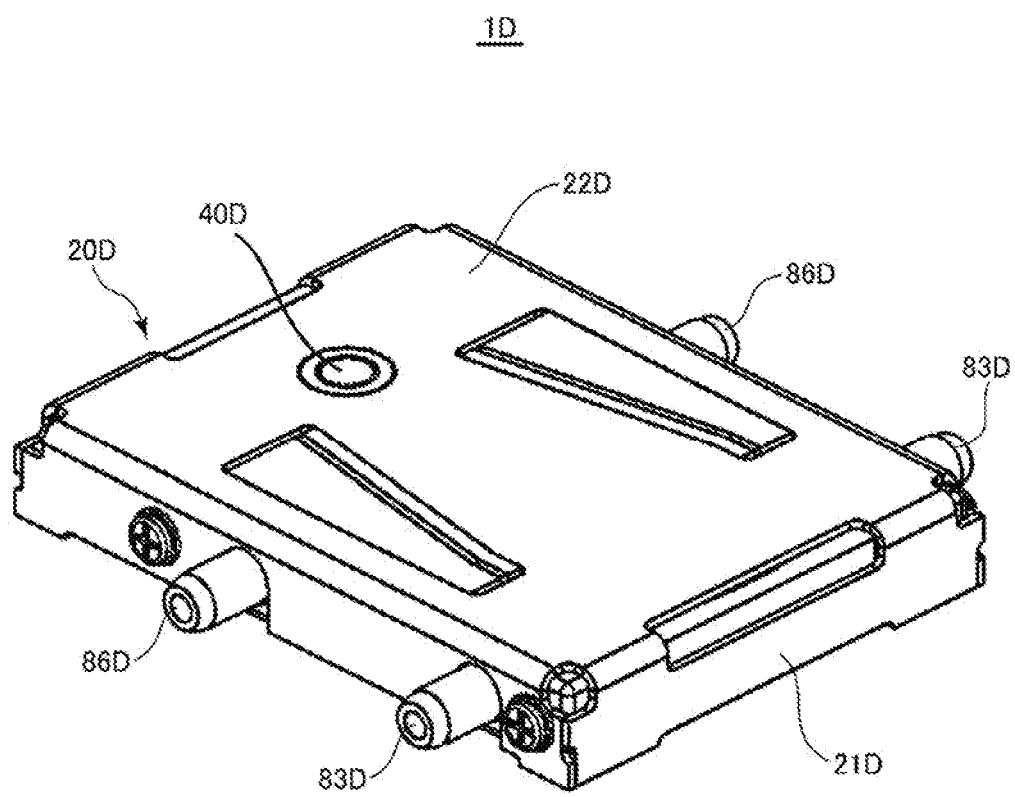
FIG. 34 is an external perspective view of a pump according to a fifth embodiment of the present invention.

FIG. 34 is an external perspective view of a pump according to a fifth embodiment of the present invention.

Figure 35:
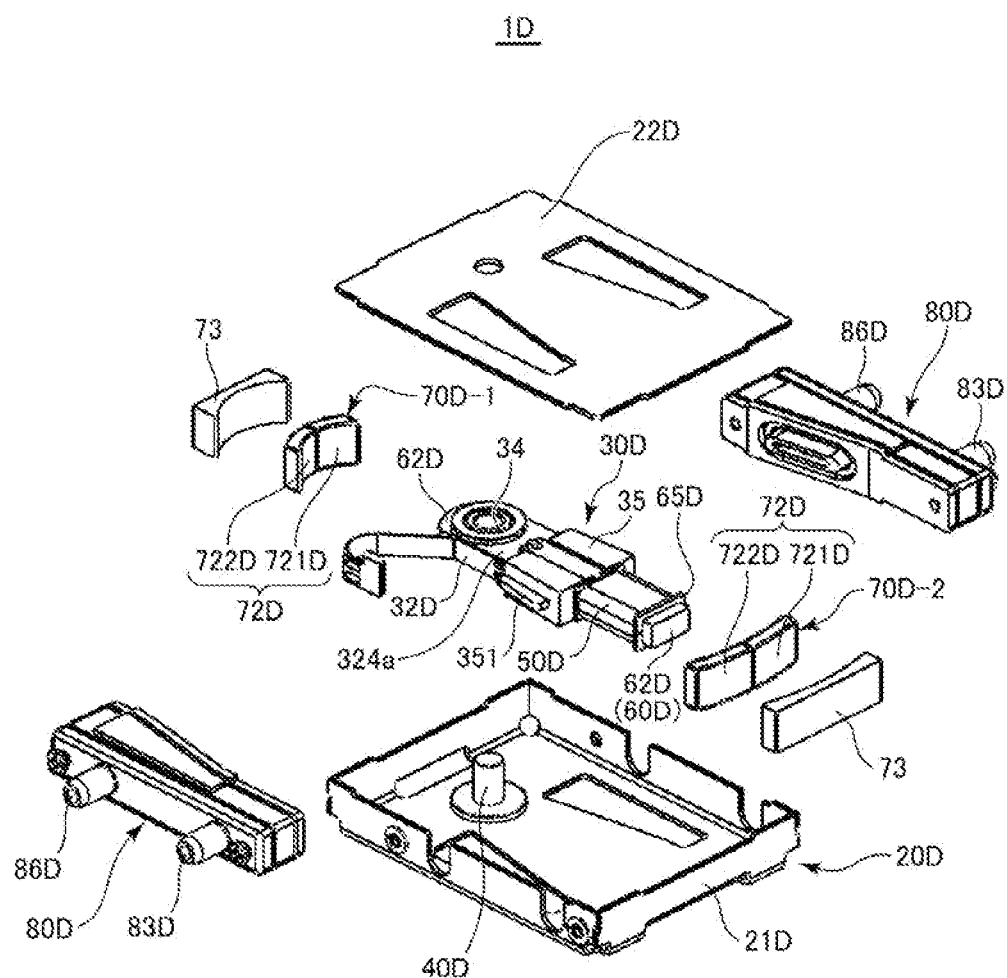
FIG. 35 is an exploded perspective view of the pump according to the fifth embodiment of the present invention.
Figure 36:
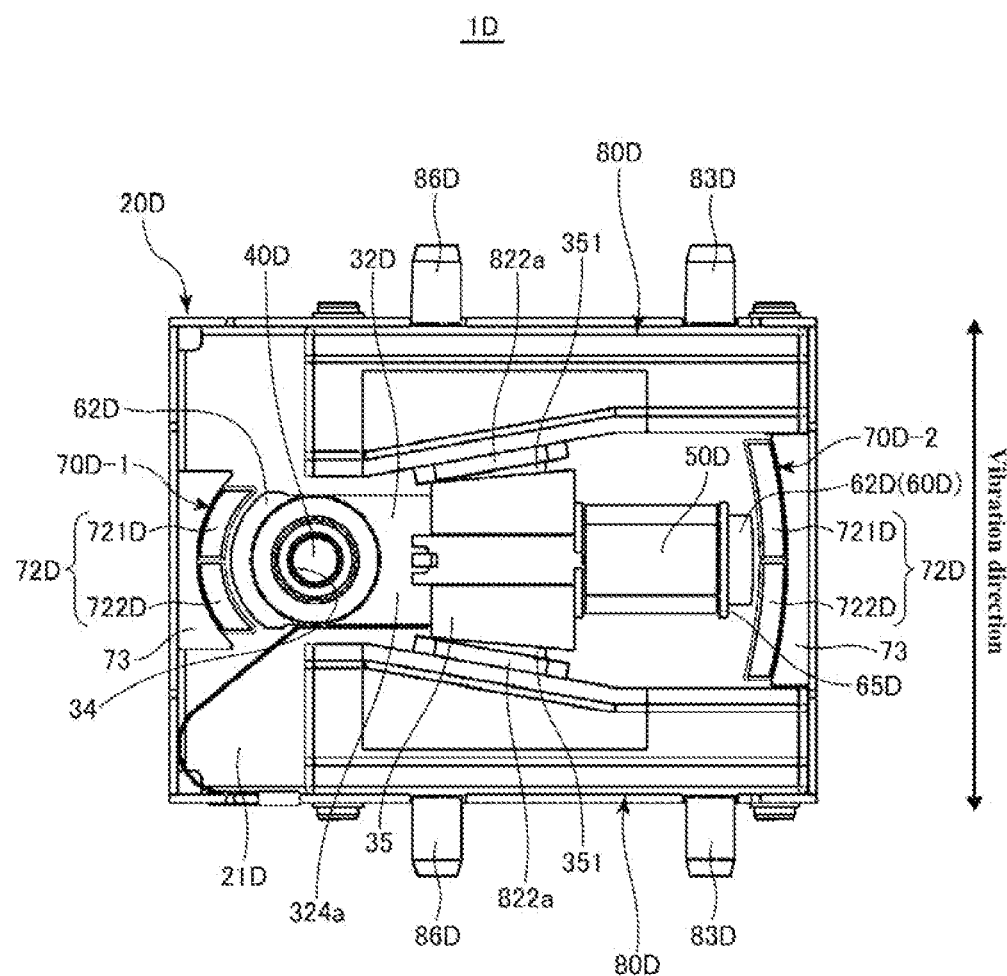
FIG. 36 is a horizontal cross-sectional view showing an internal configuration of the pump according to the fifth embodiment of the present invention.
Figure 37:
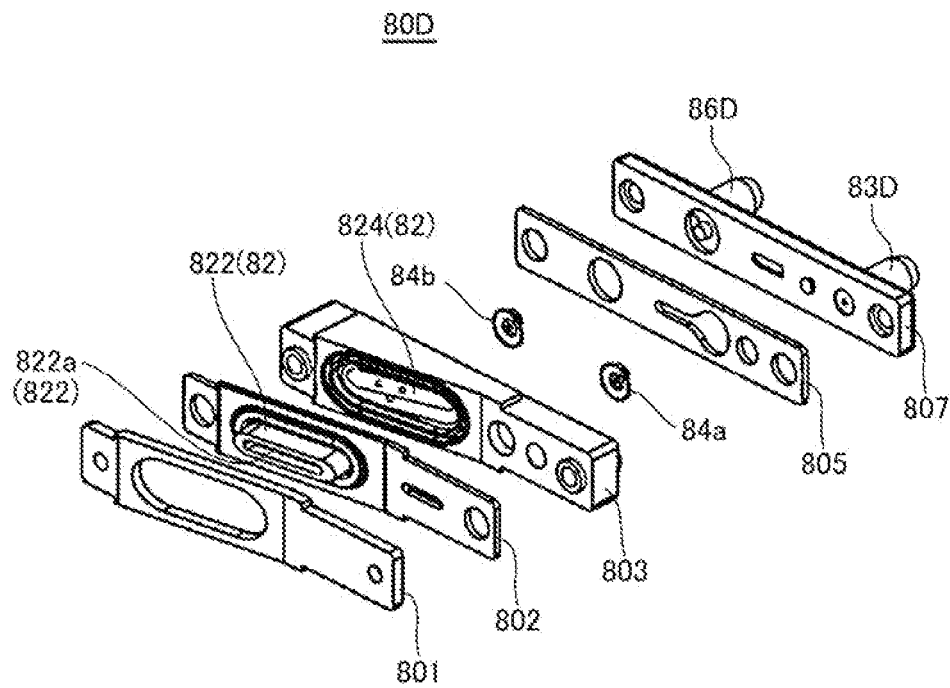
FIG. 37 is an exploded perspective view of a pump unit in the pump according to the fifth embodiment of the present invention.
Figure 38:
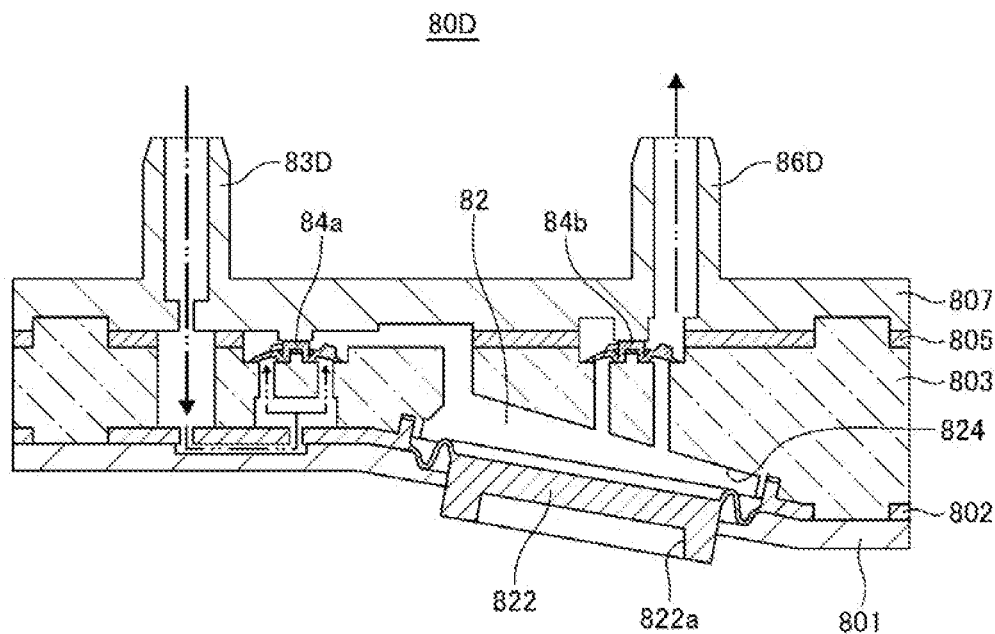
FIG. 38 is a view showing an air flow path of the pump unit in the pump according to the fifth embodiment of the present invention.
Figure 39A:
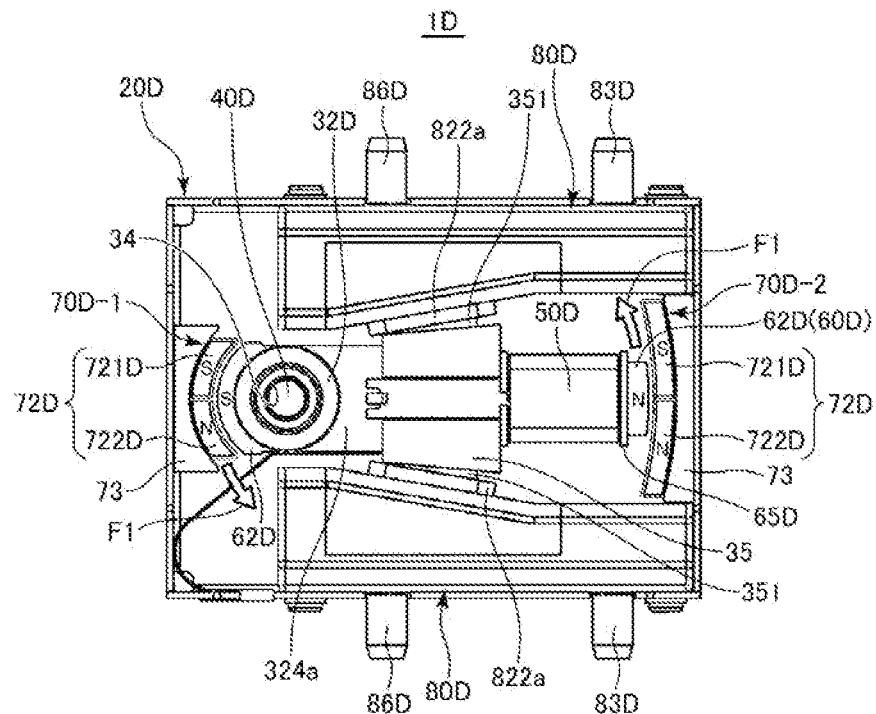
FIG. 39B is a schematic view which is referred to explain reciprocating rotational movement of a movable body in the pump according to the fifth embodiment of the present invention.
Figure 39B:
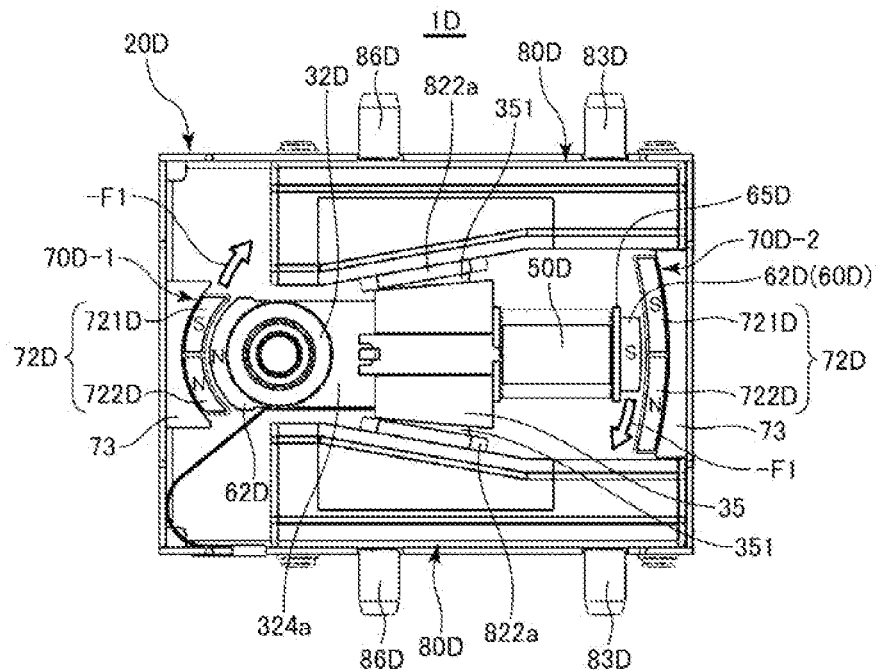

FIG. 35 is an exploded perspective view of the pump according to the fifth embodiment of the present invention. FIG. 36 is a horizontal cross-sectional view showing an internal configuration of the pump according to the fifth embodiment of the present invention. FIG. 37 is an exploded perspective view of a pump unit in the pump according to the fifth embodiment of the present invention. FIG. 38 is a view showing an air flow path of the pump unit in the pump according to the fifth embodiment of the present invention. Each of FIG. 39A and FIG. 39B is a schematic view which is referred to explain reciprocating rotational movement of a movable body in the pump unit according to the fifth embodiment of the present invention.

A pump 1D of the present embodiment has the same basic configuration as the basic configuration of the pump 1 of the first embodiment shown in FIG. 1 except that a fixed body includes magnets and a movable body includes a coil core portion. Thus, the same components are denoted by the same reference numbers and description for the same components will be omitted in the following description.

Entire Configuration of Pump 1D

The pump 1D shown in FIGS. 34 to 39 has the same basic configuration as the basic configuration of the pump 1 of the first embodiment except that a fixed body 20D includes magnets 70D (70D-1, 70D-2) and a movable body 30D includes a coil core portion 62D.

As shown in FIG. 34 and FIG. 36, the fixed body 20D of the pump 1D of the present embodiment includes a case 21D having a rectangular planar shape, a cover 22D for covering an opening portion of the case 21D opened toward the upper side, a pair of yokes 73 respectively provided on inner surfaces of wall portions of the case 21D separated from each other in a longitudinal direction of the case 21D, and a pair of magnets 70D-1, 70D-2 respectively provided on the pair of yokes 73. Further, a pair of pump units 80D are respectively provided on inner surfaces of wall portions of the case 21D separated from each other in a depth direction of the case 21D. Thus, the pair of pump units 80D are respectively disposed at positions sandwiching the movable body 30D in the depth direction of the case 21D, that is a reciprocating rotation (pivotal movement) direction of the movable body 30D with being separated from each other.

A shaft portion 40D is provided in the case 21D so as to extend from a portion on a bottom surface of the case 21D near to one of longitudinal direction end portions of the case 21D toward a height direction of the case 21D. By passing the shaft portion 40D through the bearing portion 34 of the movable body 30D, the movable body 30D can be supported in the case 21D so as to freely perform reciprocating rotation (pivotal movement) around the shaft portion 40D.

The pair of yokes 73 are respectively provided on the inner surfaces of the wall portions of the case 21D separated from each other in the longitudinal direction of the case 21D. Each of the pair of yokes 73 is formed of magnetic material and has a substantially rectangular parallelepiped entire shape including a flat surface facing the wall portion of the case 21 and an arc-shaped surface on the opposite side of the flat surface. Each yoke 73 is fixed on the inner surface of the wall portion of the case 21D so that the flat surface faces the inner surface of the wall portion of the case 21D and the arc-shaped surface is directed toward the inner side. Thus, the arc-shaped surfaces of the pair of yokes 73 respectively provided on the inner surfaces of the wall portion of the case 21D separated from each other in the longitudinal direction of the case 21D face each other through the magnets 70D-1, 70D-2 and the movable body 30D as shown in FIG. 36.

Magnet 70D

As shown in FIG. 36, each of the magnets 70D-1, 70D-2 has an arc shape corresponding to the arc-shaped surfaces of the pair of yokes 73. The magnets 70D-1, 70D-2 are respectively provided on the arc-shaped surfaces of the pair of yokes 73. Each of the magnets 70D-1, 70D-2 includes two magnetic poles 721D, 722D on its magnetic pole surface 72D facing the movable body 30D. The two magnetic poles 721D, 722D are aligned along the rotation (pivotal movement) direction of the movable body 30D and has different polarities. In one example shown in FIGS. 39A and 39B, the magnetic pole 721D is the S pole and the magnetic pole 722D is the N pole. As described above, the fixed body 20D of the pump 1D of the present invention includes the magnets 70D-1, 70D-2 unlike the pumps 1, 1A, 1B, 1C of the first to fourth embodiments.

Movable Body 30D

In the pump 1D of the present embodiment, the movable body 30D is formed of magnetic material (ferromagnetic material) and also serves as the coil core portion 62D. As shown in FIGS. 35 and 36, the movable body 30D includes a movable body main portion 32D having an arm portion 324a, a pressing portion 35 provided on the arm portion 324a, a bobbin 65D provided on a tip end portion of the arm portion 324a, and a coil 50D which is wound around the bobbin 65D and to which an electrical current is supplied from a power supply unit. In this regard, the pressing portion 35 of the present embodiment has the same configuration as the configuration of the pressing portion 35 of each of the pumps 1, 1A, 1B, 1C of the first to fifth embodiments described above.

By passing the shaft portion 40D through the bearing portion 34, the movable body 30D can be supported in the case 21D so as to freely perform the reciprocating rotation (pivotal movement). The movable body main portion 32D includes the center opening portion 322 (see FIG. 3) in which the bearing portion 34 is fitted, and the arm portion 324a provided so as to extend from the movable body main portion 32D toward a direction perpendicular to an axial direction of the shaft portion 40D. Both of the movable body main portion 32D and the arm portion 324a are formed of magnetic material (ferromagnetic material) and integrated with each other. Thus, when the electrical current is supplied in the coil 50D provided so as to surround the tip end portion of the arm portion 324a through the bobbin 65D, both end portions of the movable body 30D are magnetized with different polarities. As described above, in the pump 1D of the present embodiment, the arm portion 324a of the movable body 30D serves as a core portion 60D around which the coil 50 is wound and the movable body 30D serves as the coil core portion 62D. Further, when the electrical current is supplied to the coil 50D, both end portions of the movable body 30D are magnetized and thus serve as a core magnetic pole of the coil core portion 62D. Thus, it can be considered that the movable body 30D of the pump 1D of the present embodiment includes the coil core portion 62D. Further, it can be considered that the coil core portion 62D is provided on the tip end portion of the arm portion 324a.

The movable body 30D is provided in the case 21D so that the one end portion of the movable body 30D faces the magnet 70D-1 through an air gap in the direction perpendicular to the axial direction (rotational axis) of the shaft portion 40D and the other end portion of the movable body 30D faces the magnet 70D-2 through an air gap in the direction perpendicular to the axial direction (rotational axis) of the shaft portion 40D. Further, since both of the movable body main portion 32D and the arm portion 324a are formed of the magnetic material (ferromagnetic material), magnetic circuits are formed between the one end portion of the movable body 30D and the magnet 70D-1 and between the other end portion of the movable body 30D and the magnet 70D-2. FIG. 39A shows a state that the electrical current is supplied to the coil 50D to magnetize the one end portion of the movable body 30D facing the magnet 70D-1 with the S pole and magnetize the other end portion of the movable body 30D facing the magnet 70D-2 with the N pole. Further, FIG. 39B shows a state that the electrical current is supplied to the coil 50D in an opposite direction to reverse the polarities of both end portions of the movable body 30D, namely to magnetize the one end portion of the movable body 30D facing the magnet 70D-1 with the N pole and magnetize the other end portion of the movable body 30D facing the magnet 70D-2 with the S pole. As shown in FIGS. 39A and 39B, the magnetic circuit is provided by the one end portion of the movable body 30D serving as the core magnetic pole of the coil core portion 62D and the magnet 70D-1. Similarly, the other magnetic circuit is provided by the other one end portion of the movable body 30D serving as the core magnetic pole of the coil core portion 62D and the magnet 70D-2.

Pump Unit 80D

As shown in FIG. 37, each of the pair of pump units 80D includes a base 801, a diaphragm portion 802, a cylinder portion 803, valves 84a, 84b, a valve cover portion 805, and a flow path forming portion 807. The base 801 has one opening portion. An insertion portion 822a of the diaphragm portion 802 is passed through this opening portion from the rear side and thus the diaphragm portion 802 is disposed in a state that the insertion portion 822a protrudes toward the front side.

The diaphragm portion 802 includes one insertion portion 822a and one movable wall 822. A chamber forming portion 824 of the cylinder portion 803 is provided on the rear side of the movable wall 822 which has flexibility and can be elastically deformed. The diaphragm portion 802 and the cylinder portion 803 are attached to each other so that a sealed chamber 82 which is a sealed space is formed by the movable wall 822 of the diaphragm portion 802 and the chamber forming portion 824 of the cylinder portion 803.

As shown in FIG. 38, the valve 84a is provided so as to close a flow path for communicating between a suction portion 83D and the sealed chamber 82 defined by the movable wall 822 and the chamber forming portion 824. When pressure in the sealed chamber 82 decreases to a predetermined threshold value, the valve 84a is opened and thus the air is suctioned into the sealed chamber 82 through the suction portion 83D. When the pressure in the sealed chamber 82 exceeds another predetermined value, the valve 84a is closed and thus the suction of the air into the sealed chamber 82 through the suction portion 83D is stopped. The valve 84b is provided so as to close a flow path for communicating between a discharge portion 86D and the sealed chamber 82 defined by the movable wall 822 and the chamber forming portion 824. When the pressure in the sealed chamber 82 exceeds a predetermined threshold value, the valve 84b is opened and thus the air in the sealed chamber 82 is discharged toward the outside through the discharge portion 86D. When the pressure in the sealed chamber 82 decreases to another threshold value, the valve 84b is closed and thus the discharge of the air from the sealed chamber 82 toward the outside through the discharge portion 86D.

Referring back to FIG. 37, the valve cover portion 805 is attached to the cylinder portion 803 from the rear side of the cylinder portion 803. Further, the flow path forming portion 807 is attached to the valve cover portion 805 from the rear side of the valve cover portion 805. The suction portion 83D for suctioning the air into the sealed chamber 82 and the discharge portion 86D for discharging the air from the sealed chamber 82 are formed in the flow path forming portion 807. The suction portion 83D and the discharge portion 86D are formed so as to protrude from the rear side of the flow path forming portion 807 toward the outside. As shown in FIG. 34, the suction portions 83D and the discharge portions 86D protrude from the short-side wall portion of the case 21D of the pump 1D toward the outside.

FIG. 38 shows the flow path for suctioning the air into the sealed chamber 82 through the suction portion 83D and the flow path for discharging the air in the sealed chamber 82 through the discharge portion 86D. Arrowed lines in FIG. 38 represent the flow of the air. When the valve 84a is opened, the air is suctioned into the sealed chamber 82 through the suction portion 83D. On the other hand, when the valve 84b is opened, the air in the sealed chamber 82 is discharged toward the outside through the discharge portion 86D. Similar to the above-described pumps 1, 1A, 1B, 1C of the first to fourth embodiments, the pusher 351 of the pressing portion 35 is connected to the insertion portion 822a of the sealed chamber 82. Thus, when the movable body 30D performs the reciprocating rotation (pivotal movement), the pressure in the sealed chamber 82 changes according to the reciprocating rotation movement (pivotal movement) of the movable body 30D, and thereby the suction of the air into the sealed chamber 82 and the discharge of the air from the sealed chamber 82 toward the outside are performed.

Next, the reciprocating rotation movement of the movable body 30D in the pump 1D will be described with reference to FIGS. 39A and 39B. FIG. 39A shows the state that the electrical current is supplied to the coil 50D to magnetize the one end portion of the movable body 30D facing the magnet 70D-1 with the S pole and magnetize the other end portion of the movable body 30D facing the magnet 70D-2 with the N pole. As shown in FIG. 39A, the one end portion of the movable body 30D which is the S pole repels the magnetic pole 721D of the magnet 70D-1 which is the S pole and attracts the magnetic pole 722D of the magnet 70D-1 which is the N pole. As a result, thrust force for rotating (pivotally rotating) the movable body 30D in the direction F1 is generated at the one end portion of the movable body 30D. On the other hand, the other end portion of the movable body 30D which is the N pole attracts the magnetic pole 721D of the magnet 70D-2 which is the S pole and repels the magnetic pole 722D of the magnet 70D-2 which is the N pole. As a result, the thrust force for rotating (pivotally rotating) the movable body 30D in the direction F1 is also generated at the other end portion of the movable body 30D.

FIG. 39B shows the state that the electrical current is supplied to the coil 50D in the opposite direction to reverse the polarities of both end portions of the movable body 30D, namely to magnetize the one end portion of the movable body 30D facing the magnet 70D-1 with the N pole and magnetize the other end portion of the movable body 30D facing the magnet 70D-2 with the S pole. As shown in FIG. 39B, the one end portion of the movable body 30D which is the N pole attracts the magnetic pole 721D of the magnet 70D-1 which is the S pole and repels the magnetic pole 722D of the magnet 70D-1 which is the N pole. As a result, thrust force for rotating (pivotally rotating) the movable body 30D in the direction −F1 is generated at the one end portion of the movable body 30D. On the other hand, the other end portion of the movable body 30D which is the S pole repels the magnetic pole 721D of the magnet 70D-2 which is the S pole and attracts the magnetic pole 722D of the magnet 70D-2 which is the N pole. As a result, the thrust force for rotating (pivotally rotating) the movable body 30D in the direction −F1 is also generated at the other end portion of the movable body 30D. With this configuration, the movable body 30D can suitably perform the reciprocating rotation (pivotal movement) around the shaft portion 40D in the case 21D by supplying an alternating electrical current having a proper frequency into the coil 50D.

As described above, by changing the direction of the electrical current supplied to the coil 50D in the pump 1D, the movable body 30D including the coil core portion 62D can perform the reciprocating movement (reciprocating vibration) in the vibration direction similarly to the first embodiment. In this regard, the driving principle and the pump performance of the pump 1D are the same as those of the pump 1 of the first embodiment indicated by the above equations (1), (2), (3), (4) and (5). Further, since the coil 50D is provided on the arm portion 324a of the movable body 30D which performs the reciprocating rotation (pivotal movement), the vibration actuator 10 of the present embodiment, is a moving coil-type actuator. On the other hand, since the magnet 70, 70A, 70B or 70C is provided on the movable body 30, 30A, 30B or 30C in the above-described first to fourth embodiment, the vibration actuator 10 of each of the first to fourth embodiments is a moving magnet-type actuator.

The above-described pump of each embodiment may be provided in a wearable device or the like to measure blood pressure. Further, a pump device may be a sphygmomanometer in which the pump is provided integrally with the cuff. Further, the pump may be used as an air pump provided in a water cistern. The power supply unit for the pump device may be driven by a battery such as a dry-cell battery. In this case, it is noted that the pump device should have a configuration in which an electrical current of the dry-cell battery should be converted to an electrical current for driving the pump, that is a direct electrical current is converted to an alternating electrical current.

Sixth Embodiment

Figure 40:
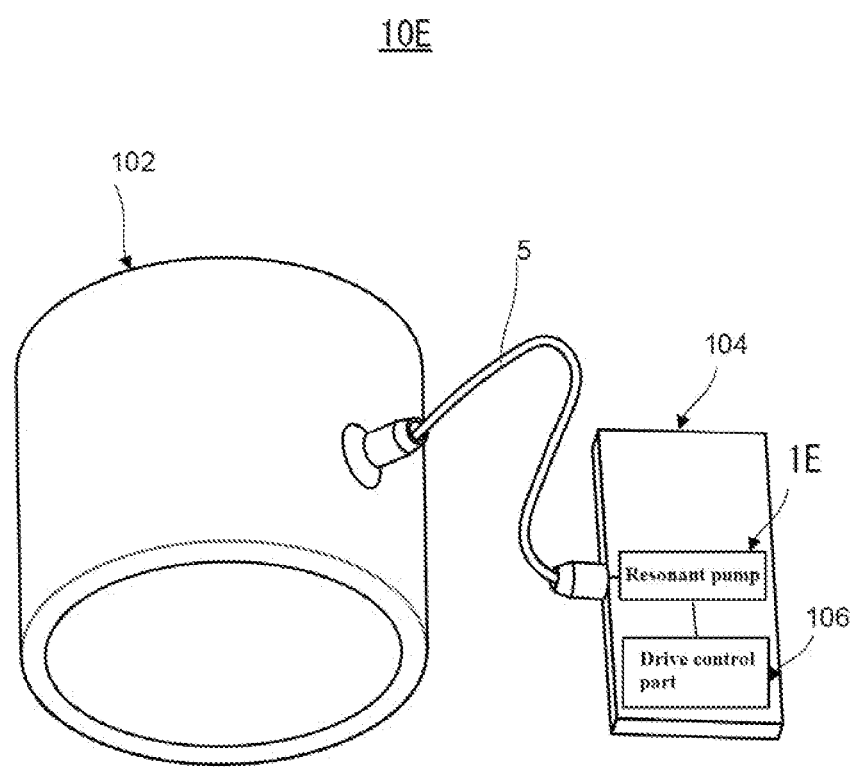
FIG. 40 is a view schematically showing an air supply device according to a sixth embodiment of the present invention.

FIG. 40 is a view schematically showing an air supply device according to a sixth embodiment of the present invention. A pump device shown in FIG. 40 is, for example, a sphygmomanometer 10E as an air supply device.

The sphygmomanometer 10E includes a cuff 102, a tube 5 for supplying air into the cuff 102, and a drive unit 104.

The drive unit 104 includes a drive control part 106 and a resonant pump 1E which can be any one of the pumps 1A to 1D of the embodiments. A driving signal converted for driving the resonant pump 1E is inputted from the drive control part 106.

The drive control part 106 is connected to the resonant pump 1E and a circuit for driving the vibration actuator 10 is provided in the drive control part 106. The drive control part 106 supplies the driving signal to the resonant pump 1E.

The resonant pump 1E is driven according to the driving signal inputted from the drive control part 106. More specifically, the tube 5 is connected to the discharge portion 86 of the resonant pump 1E and the movable body 30 of the resonant pump 1E vibrates to drive the pump units 80. As a result, it is possible to suitably supply the air into the cuff of the sphygmomanometer or the like.

With this configuration, it is possible to secure a desired pressure and a desired flow rate with making the sphygmomanometer 10D thinner. The embodiments of the present invention have been described in the above description. The above description exemplifies the preferred embodiments of the present invention and the scope of the present invention is not limited thereto. In other words, the configuration of the device and the shape of each part are provided as only examples and it would be obvious that various modifications and additions to these examples are possible within the scope of the present invention.

INDUSTRIAL APPLICABILITY

The pump and the air supply device according to the present invention have the effect of ensuring the high discharge pressure and the high flow rate and can further reduce the thickness thereof. For example, the pump and the air supply device are useful for a wearable device to which a high output and a thin thickness are desired. For the reasons stated above, the present invention has industrial applicability.

The invention claimed is:
1. A pump, comprising:
a vibration actuator which can be electromagnetically driven; and
a pump unit for suctioning and discharging fluid due to electromagnetic drive of the vibration actuator,
wherein the vibration actuator includes:
a fixed body on which the pump unit is provided, the fixed body containing one of a coil core portion having a coil and a core portion around which the coil is wound and a magnet disposed so as to face an end portion of the core portion,
a movable body elastically held by magnetic attraction force of the magnet, the movable body containing another one of the coil core portion and the magnet, and
a shaft portion for supporting the movable body so that the movable body can perform reciprocating rotation,
wherein the pump unit includes:
a movable wall which can be moved by rotational movement of the movable body, and
a sealed chamber which is communicated with a discharge port for the fluid and a suction port for the fluid and whose volume can be changed by displacement of the movable wall,
wherein the movable body has:
a pressing portion which can be moved in an arc track around the shaft portion and abut against the movable wall to press the movable wall when the movable body performs the reciprocating rotation, and
an arm portion extending in a direction perpendicular to an axial direction of the shaft portion from a portion axially supported by the shaft portion,
wherein the arm portion has:
a round hole passing through the arm portion in the axial direction of the shaft portion, and
a long hole passing through the arm portion in the axial direction of the shaft portion and elongated in the direction perpendicular to the axial direction of the shaft portion,
wherein the pressing portion has:
a shaft protrusion axially attached to the round hole of the arm portion, and
a guide protrusion loosely fitted in the long hole of the arm portion, wherein the pressing portion linearly presses the movable wall when the movable body performs the reciprocating rotation, and wherein the movable wall is disposed in a moving direction of the pressing portion and displaced when the movable wall is linearly pressed by the pressing portion to discharge the fluid in the sealed chamber through the discharge port.

2. The pump as claimed in claim 1, wherein the other one of the coil core portion and the magnet is provided on an end portion of the arm portion, wherein the sealed chamber contains a pair of sealed chambers, wherein the pair of sealed chambers are disposed so as to face each other at position sandwiching the arm portion in a reciprocating rotation direction of the arm portion, wherein the movable wall contains a pair of movable walls, wherein the pressing portion has a pair of pushers respectively corresponding to the pair of movable walls, and wherein each of the movable walls of the sealed chamber is linearly pressed by the pusher when the arm portion performs reciprocating rotation.

3. The pump as claimed in claim 1, wherein the arm portion contains a pair of arm portions respectively extending in opposite directions perpendicular to the axial direction of the shaft portion from the portion axially supported by the shaft portion, wherein each of the arm portions has an end portion, wherein the other one of the coil core portion and the magnet is provided on the end portion of each of the arm portions, and wherein the one of the coil core portion and the magnet is provided on the fixed body so as to face the other one of the coil core portion and the magnet, wherein the sealed chamber contains a pair of sealed chambers, wherein the pair of sealed chambers are disposed side by side along an extending direction of the pair of arm portions, wherein the movable wall contains a pair of movable walls, wherein the pressing portion has a pair of pushers respectively corresponding to the pair of movable walls, and wherein each of the movable walls of the sealed chamber is linearly pressed by the pusher when the arm portions perform reciprocating rotation.

4. The pump as claimed in claim 3, wherein the pair of sealed chambers are communicated with the discharge port.

5. The pump as claimed in claim 2, wherein the pushers are respectively connected to the movable walls.

6. The pump as claimed in claim 1, wherein the magnet is provided on one of the movable body and the fixed body and forms a magnetic spring together with the core portion of the coil core portion provided on another one of the movable body and the fixed body.

7. The pump as claimed in claim 1, wherein the magnet is magnetized so as to have three magnetic poles, and wherein the coil is wound around the core portion of the coil core portion and the core portion of the coil core portion has two magnetic poles facing the magnet in a magnetization direction of the magnet.

8. The pump as claimed in claim 1, wherein the magnet is magnetized so as to have four magnetic poles, and wherein the coil is wound around the core portion of the coil core portion and the core portion of the coil core portion has three magnetic poles facing the magnet in a magnetization direction of the magnet.

9. The pump as claimed in claim 1, wherein the magnet is magnetized so as to have four magnetic poles, wherein the coil contains three coils, and wherein the three coils are would around the core portion of the coil core portion and the core portion of the coil core portion has three magnetic poles facing the magnet in a magnetization direction of the magnet.

10. The pump as claimed claim 1, wherein the movable body has one end portion axially supported by the shaft portion so that the movable body can perform the reciprocating rotation and another end portion on which the other one of the coil core portion and the magnet is provided, wherein the fixed body has the one of the coil core portion and the magnet which faces the other one of the coil core portion and the magnet in a direction perpendicular to a rotational axis of the movable body, and wherein the magnet is magnetized so as to have two magnetic poles.

11. The pump as claimed in claim 10, wherein the core portion has three magnetic poles around which the coil is wound.

12. The pump as claimed in claim 1, wherein the movable body has one end portion axially supported by the shaft portion so that the movable body can perform the reciprocating rotation and further contains the coil core portion, and wherein the fixed body contains the magnet facing the coil core portion in a direction perpendicular to a rotational axis of the movable body.

13. An air supply device, comprising: the pump defined by claim 1.

* * * * *